United States Patent [19]

Belfer et al.

[11] Patent Number: 5,045,994
[45] Date of Patent: Sep. 3, 1991

[54] EMULATION PROCESS HAVING SEVERAL DISPLAYED INPUT FORMATS AND OUTPUT FORMATS AND WINDOWS FOR CREATING AND TESTING COMPUTER SYSTEMS

[75] Inventors: Daniel F. Belfer, Piscataway; Ann G. Lech, Middlesex; Isaac M. Perelmuter, West Orange; Jerry J. Ward, Matawan, all of N.J.

[73] Assignee: Bell Communications Research, Inc., Livingston, N.J.

[21] Appl. No.: 910,668

[22] Filed: Sep. 23, 1986

[51] Int. Cl.⁵ .......................... G06F 9/455; G06F 3/14
[52] U.S. Cl. .................................. 364/200; 369/286; 369/286.2; 369/237.2; 369/237.3; 369/232.3
[58] Field of Search ... 364/200 MS File, 900 MS File; 235/379, 380, 381, 382; 340/721, 700, 734, 755

[56] References Cited

U.S. PATENT DOCUMENTS

| | | | |
|---|---|---|---|
| 4,458,331 | 7/1984 | Amezana et al. | 364/900 |
| 4,509,122 | 4/1985 | Agnew et al. | 364/200 |
| 4,570,217 | 2/1986 | Allen et al. | 364/900 |
| 4,601,010 | 7/1986 | Briscoe | 364/900 |
| 4,604,710 | 8/1986 | Amezena et al. | 364/900 |
| 4,727,480 | 2/1988 | Albright et al. | 364/200 |

OTHER PUBLICATIONS

"The LEAP Load and Test Driver", Dolotta, Licwinko, Menninger and Roome, *IEEE Catalog No.* 76CH1125-4C, pp. 182-186.

*Primary Examiner*—Thomas C. Lee
*Assistant Examiner*—Robert B. Harrell
*Attorney, Agent, or Firm*—John T. Peoples

[57] ABSTRACT

A method of operating a computer system is disclosed that facilitates the creation and testing of application system software by utilizing an autonomous environment to emulate the application system environment. The emulation environment allows the user to call into view sequences of standard input-output (I/O) screen format pairs normally used to submit information to and receive information from the application system. In the emulation mode, these screens are prepared off-line and stored until the user desires to exercise the application system. Each input format is filled with information that will serve as actual input to the application system when it is exercised. Each output format is filled with information that comprises expected results when the application system is actually exercised. The expected results are compared to actual results after execution of each I/O pair and further application system processing is controlled by the comparison results. The stand-alone emulation environment provides editing and control routines and library functions to aid the user in defining and modifying the I/O sequences.

9 Claims, 18 Drawing Sheets

DIALOG CONTROLLER 1000

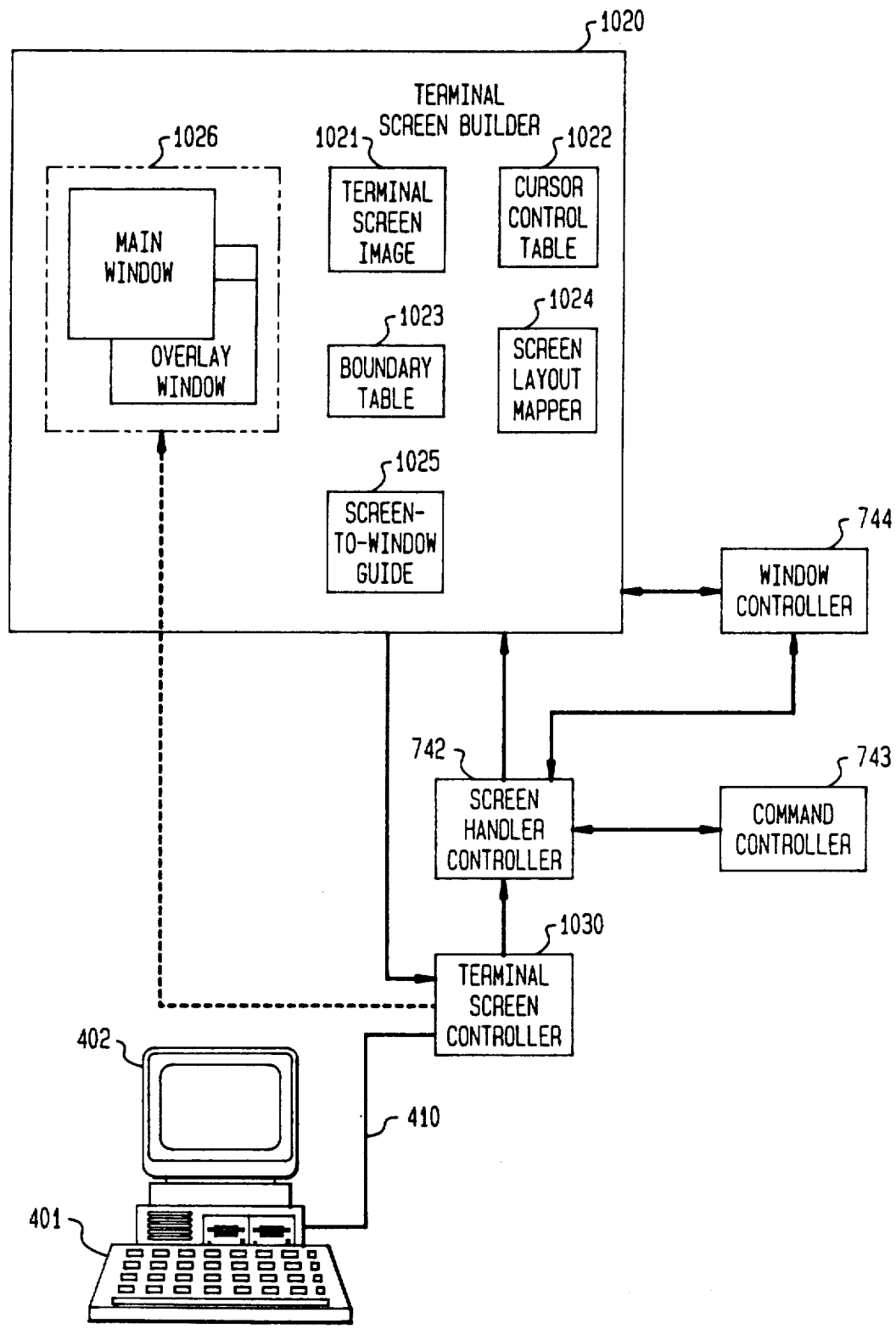

FIG. 11A
FIG. 11
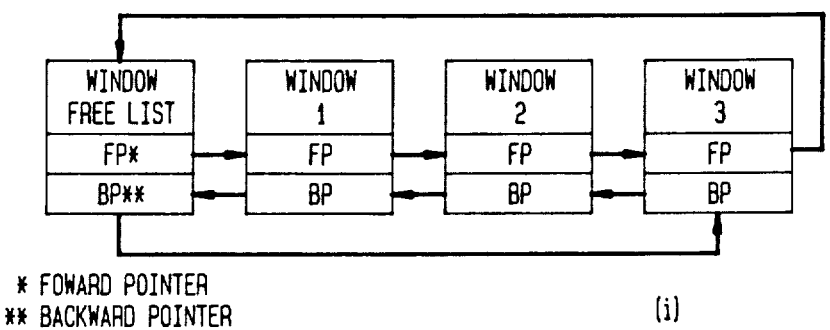
* FOWARD POINTER
** BACKWARD POINTER
(i)
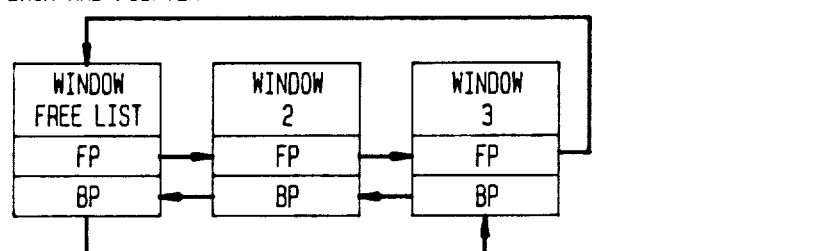
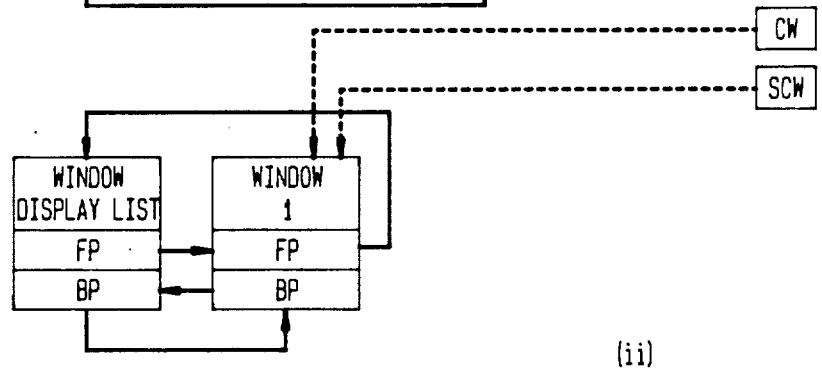
(ii)
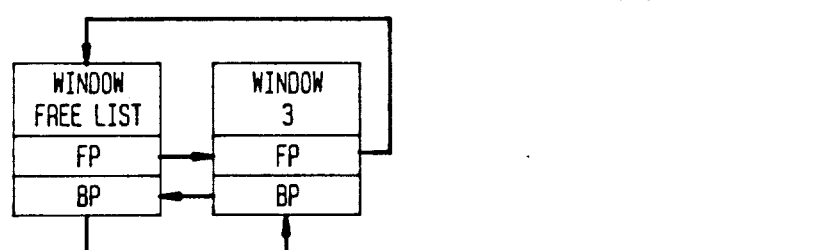
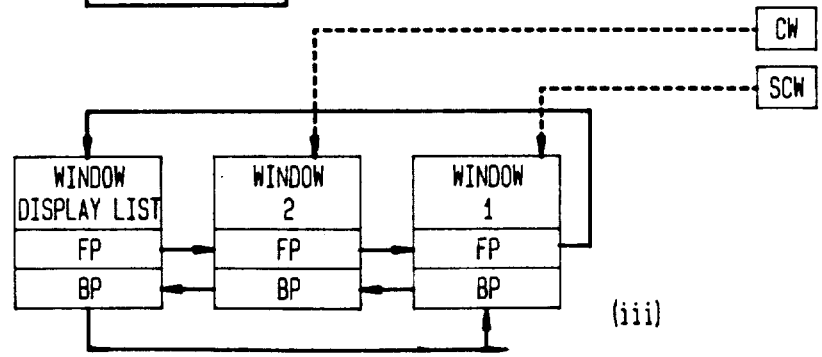
(iii)

FIG. 11B
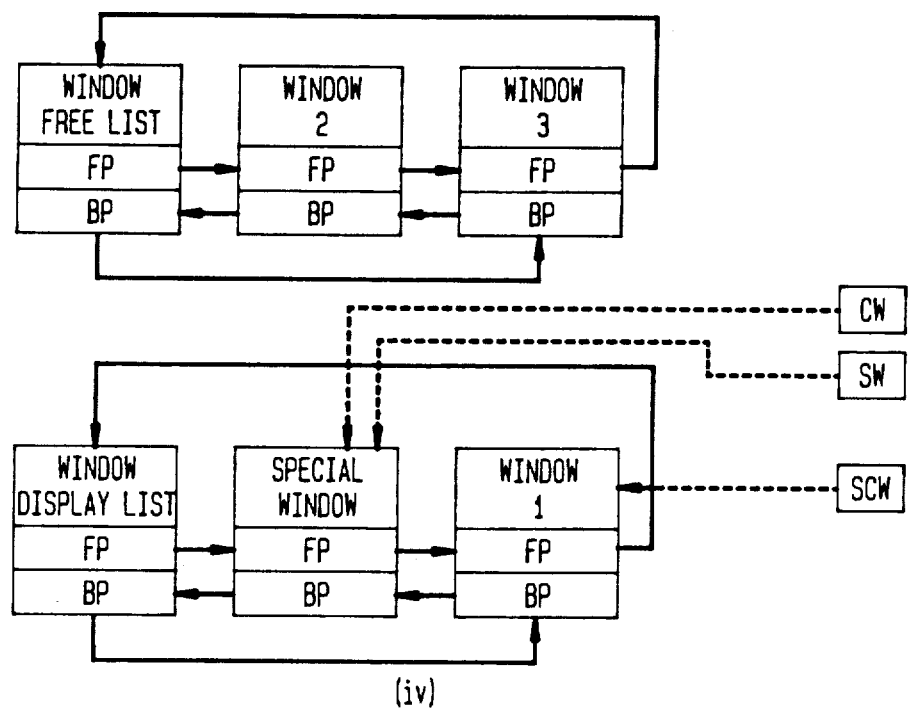
(iv)
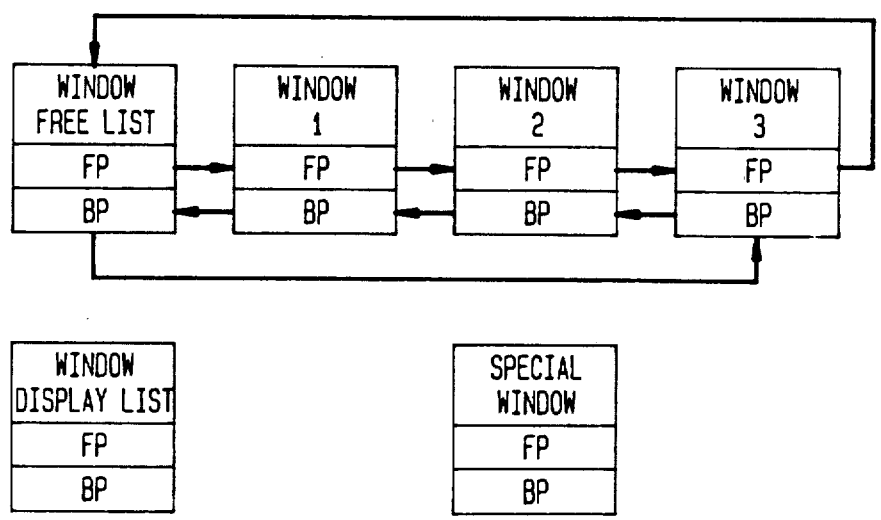
(v)

COMMAND CONTROLLER 743

FIG. 15

MENU DEFINITION TABLE FILE

| FIELD NUMBER | COMMAND WORD | MENU TEXT AND EMBEDDED FIELD NUMBERS |
|---|---|---|
| 1 | | 3 SETS     5-STRUCTURE  ...  8-SAVE ... |
| ⋮ | | |
| 3 | SETS | 10-JUMP    11-ADD           12-DELETE |
| ⋮ | | |
| 5 | STRUCTURE | 62-LOOP   63-DECISION |
| ⋮ | | |
| 8 | SAVE | |
| ⋮ | | |
| 10 | JUMP | SET (14)____    TEST SEQ. NAME (143)_____ |
| 11 | ADD | AFTER (30)____ BEFORE (31)____ SET (32)____ |
| 12 | DELETE | SET (33)____   TO SET (34)____ |
| ⋮ | | |
| 30 | AFTER | |
| 31 | BEFORE | |
| 32 | SET | |
| ⋮ | | |

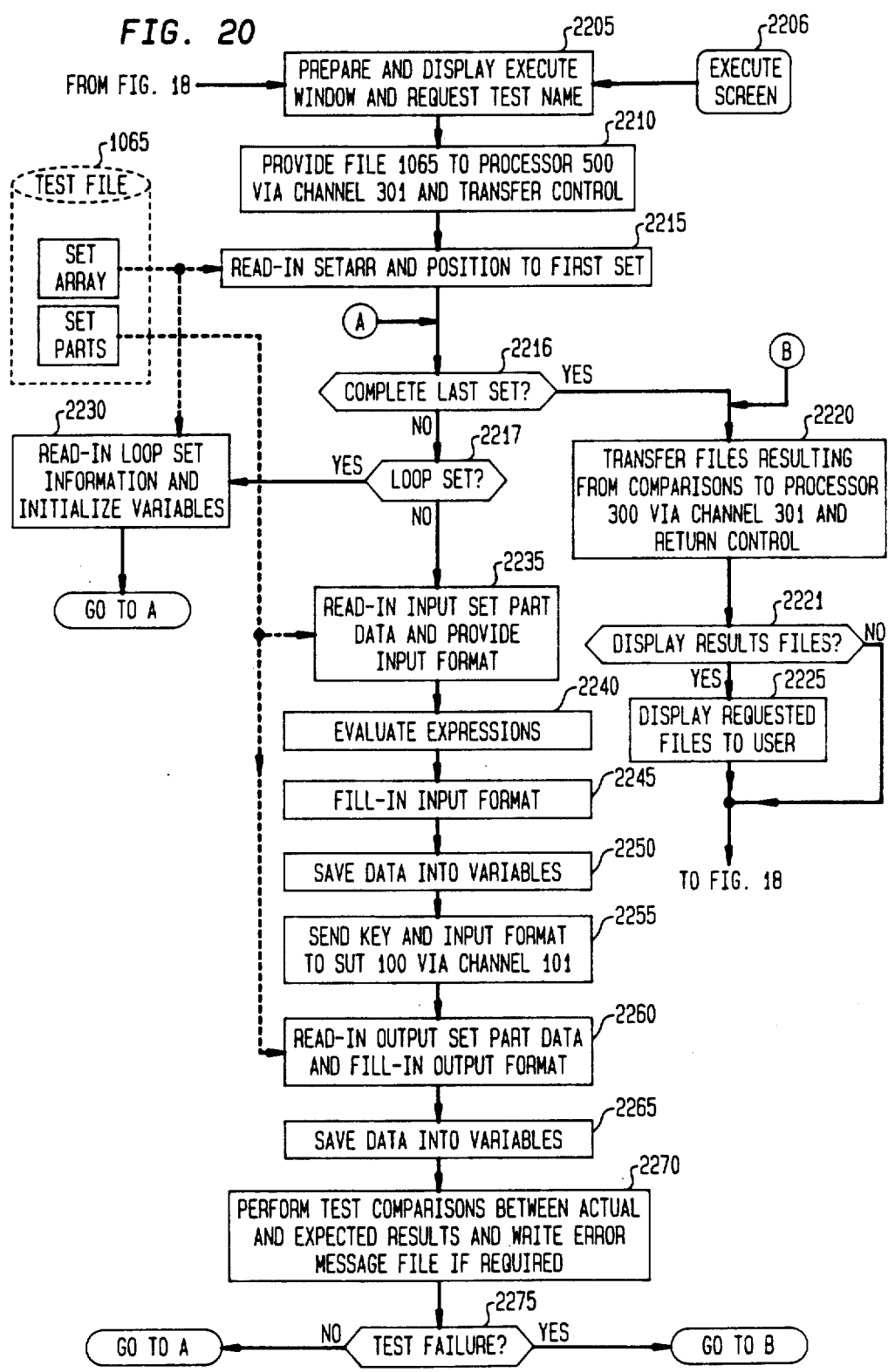

EMULATION PROCESS HAVING SEVERAL DISPLAYED INPUT FORMATS AND OUTPUT FORMATS AND WINDOWS FOR CREATING AND TESTING COMPUTER SYSTEMS

TECHNICAL FIELD OF THE INVENTION

This invention relates generally to the process of developing large-scale software systems and, more particularly, to a methodology for creating and testing the software in an environment emulating the production environment in which the software is ultimately deployed.

BACKGROUND OF THE INVENTION

The development and maintenance of a large-scale software system generally consumes a substantial amount of time, effort and financial resources and requires the coordinated interaction of personnel with diverse talents and skills throughout the development process.

Typically, a large-scale software system will comprise a number of software subsystems and each subsystem, in turn, is composed of numerous modules. Each module is designed to perform a selected low-level function. Various modules are then integrated at a higher functional level to form a particular subsystem capable of effecting a specific task. All the subsystems are further integrated at an even higher functional level and thereby provide the full functionality required of the entire system.

An illustrative example of a large software system that finds widespread use in the telecommunications environment is the TIRKS system (TIRKS is a registered trademark of Bell Communications Research, Inc.). At its inception during the early 1970's, the TIRKS system began as a relatively small system. An early version of the TIRKS system was written in assembly language for deployment on a large mainframe computer system. At that time, the TIRKS system had only a few subsystems. Its function was two-fold, namely, to track inter-office circuit orders and to store and inventory inter-office equipment and facilities. To exploit advances in computer and communications technology as well as expanding upon the capabilities of the TIRKS system, the system has been continuously updated and augmented by adding other subsystems and accompanying modules. Currently, the TIRKS system contains about 50 different subsystems embodied in approximately 10 million lines of source code and composed of 23,000 different modules. These subsystems now provide a number of diverse functions, such as: marketing (accepting customer orders for inter-office network services); provisioning (equipment and facility inventorying, order tracking as well as inter-office equipment and facility assignment); and operations (establishing actual inter-office connections as well as the monitoring and testing of the inter-office network).

With this general organizational overview of a large-scale software system in focus, it is instructive to consider the so-called "life cycle" of a software system. The "life cycle" generally may, for purposes of this discussion, be partitioned into a number of serially-occurring, basically mutually exclusive phases. The scope of activity that occurs at each phase varies depending upon whether the software system is entirely new or is on-going and evolving, such as the TIRKS system.

During an initial phase, which might be characterized as a "conceptualization" phase, generic requirements are produced wherein the high-level functionality of the overall system is specified. It is during this phase that the ultimate users of the system elucidate their requirements and objectives to the system analysts. Various alternative solutions aimed at achieving the objectives are proposed and the analysts select the most viable solution and then generate the requirements.

A second phase, the "implementation" phase, commences when the requirements are further analyzed and parsed to obtain a refined system definition. The system is now viewed as comprising an arrangement of stand-alone but interdependent modules. These modules are usually developed separately by different groups or individuals. The development effort at this juncture comprises coding of the modules in a specific computer language, such as the C language, and then testing the execution of the individual modules.

The third phase, called "integration", is initiated by combining appropriate modules into their respective subsystems, thereby forming the overall system. Subsystem testing may also be effected to insure that the modules are properly linked and compatible.

A fourth phase, called "system test", begins when the overall system is handed off to the testers. Thus, instead of releasing the system directly to the end users, an in-house test group is interposed in the "life cycle", with the charter of "trouble-shooting" the intended release. It is well-established that the cost of correcting software defects after a software system has reached the end user is significantly greater than correcting defects found before the system reaches that stage. This has lead to an increased emphasis on reduction of errors during system development, primarily by testing. The objective of the testers is to locate any problems. A "problem" is a discrepancy between what was intended to be implemented and what the system actually does as revealed through testing. In a large system, system testers are faced with the dilemma of how to choose test cases effectively given practical limitations on the number of test cases that can be selected.

A final phase begins when the system is embedded in the user's environment for purposes of acceptance testing. In this phase, particularly if the system is to replace or enhance a similar software system, the replacement system may actually augment the operation of the prior software system. However, the primary purpose of acceptance testing is to determine if the system accomplishes what the user requested and, secondarily, to detect problems for corrective action. After successful completion of this final phase, the system is released to become part of the user's production environment.

Despite all of the testing in the various phases, it is possible that the system may contain an unforeseen error, called a "bug", which will only be discovered during actual use. Each "bug" is eliminated by first detecting its source, and then "conceptualizing" and designing a solution followed by a suitable modification of the system. In effect, each major "bug" effects a new "life cycle". Other causes of a "life cycle" iteration include intended enhancements and modifications or technology changes to take advantage of intervening advances that have occurred since the time the entire system was first developed.

As suggested by the above discussion, a large-scale system development effort is organized around the various phases of the "life cycle". Each organization performs its specified activities and hands off its portions of the system, or "units", to the next organization. Thus, each organization tends to have a local, rather than a global, viewpoint of the overall system.

In order to hand-off the units to the next organization, it is typically required that the units satisfy some quantifiable but limited objective criteria. For example, it might be required that all modules are present, that they are at the proper source code level and are compiled, and that the code is at least executable. Thus, when an organization receives its units of interest, it is expected that the units are operational, even if only at a rudimentary level, so that the receiving organization may quickly begin to perform its activity. However, even though objective criteria are established for hand-off, it is generally true that the ultimate decision to pass on a given unit is mainly the result of a subjective evaluation.

Control of the process during conventional software development tends to be somewhat subjective in nature because, unlike the case of traditional hardware development, there are no sophisticated, objective control procedures that pervade or encompass all phases of the development. In effect, there are no universally applicable methods or techniques that can quickly and accurately perform detailed measurements and report on results within acceptable time limits and resource usage.

As also alluded to in the overview discussion of the "life cycle" phases, testing considerations, either implicitly or explicitly, occur during all development phases. However, controlled formal testing has been concentrated at the system level in the "system test" organization. Principally, this is due to the lack of tools that would efficiently allow for the development and sharing of tests by different organizations.

Historically, the initial method of testing could be characterized as manual and autonomous. With respect to the TIRKS system, which uses a video display terminal (VDT) as an input/output device, "manual" generally means a person positioned at the VDT makes terminal entries, transmits the entries to the unit under test, and then evaluates responses returned for display on the VDT. Based on the response, a new set of terminal entries is entered and a new response is evaluated. This request-response procedure continues until the person is satisfied with all responses or, if "bugs" are detected, until the "bugs" are fixed and the unit is retested. By "autonomous" is meant that only the person making the VDT entries is aware of exactly how and why the unit was exercised during each test session (unless the test exercise was documented, which is typically not the case). In effect, autonomous tests are not tests that can be repeated precisely nor are they in a form to be passed to the next organization.

In order to mitigate the autonomous nature of testing, at least at the overall system level, controlled formal testing was lodged in the "system test" organization. So-called test scripts are developed and maintained by the testers. A test script is a listing of the entries to be supplied to a VDT by the tester as well as a listing of the responses expected for evaluation. Even with this advancement to manual mode testing, clearly it was and is still time consuming and prone to error.

Because of the shortcomings of manual mode testing, so-called automated mode testing was introduced in order to exercise the system by the tester. The test scripts are now supplied to the system under test in a rapid, repeatable fashion. Automated testing assures that the script is followed precisely and evaluations via comparisons of responses on the VDT to stored, anticipated responses may also be done precisely. Automated tests can also be written to be deterministic. By deterministic is meant that during test execution, the test itself can determine if system responses are as expected; if not, the test reports an error. With deterministic tests, the time a tester spends on post-test analysis can be significantly reduced, and virtually eliminated if no unexpected responses are reported. Moreover, system testers are freed to do more productive duties, such as new script development, rather than performing the essentially clerical function of following a script with entries to a VDT. In addition, automated tests can be executed during any time period and do not require that the tester be present to run tests. Also, especially important automated scripts will be maintained to correspond to system updates and enhancements so as to benefit from the deterministic aspects of automated tests. In this way, "regression" testing, that is, comparison of results from a new version of a system to prior, "benchmark" results from an earlier version or previously tested versions are readily accomplished. And finally, automated tests can produce, as a side-effect of the testing itself, a precise machine record of what has been tested and the results of that testing. Therefore, there exists a provable and objective measurement as to the extent that the system under test operates as expected, which is precisely what needs to be measured as a software system moves through its "life cycle".

Automated testing as it is practiced today, however, does have its own deficiencies and limitations. Most troublesome is the need to learn a new computer language. A manual test script, which is carried out by terminal entries, is transmitted to the system under test via a block of data propagating over a channel. An automated test script version of a manual script must provide the equivalent of the data block without the necessity for human interactive terminal entries. In conventional automated testing, the new computer language performs the interfacing function of the off-line building of data blocks equivalent to the desired terminal entries as well as the off-line storing of anticipated responses from the system for comparison to actual returned responses.

Even with automated testing, system testing is still lodged in the system testing organization because of the specialized expertise required of testers. Oftentimes, in fact, it is required that two individuals be teamed to create the equivalent of a single tester. One of the individuals on the team is familiar with the actual application environment and knows the techniques to exercise the system properly but not the special computer language; the second team member is knowledgeable about the special testing language but does not know the application environment in requisite detail. This pairing of individuals is expensive and leads to inefficiencies.

In concluding this Background Section, it is instructive to conjure: (1) a first depiction of the conventional five phases in the life-cycle of the system development process; and (2) a second depiction of a model for an improved process. The second depiction serves as a point of departure for the principles of the present invention. With respect to the first visualization, developers have viewed the five life-cycle phases of one iteration as five activities placed side-by-side with a modicum of interaction between adjacent events and basically no interaction between non-adjacent events. A second iteration causes a second set of five phases to be placed adjacent to the first set so that "acceptance testing" of the first set serves as input to "conceptualization" of the second set. This straight line depiction is replicated throughout the life of the software system as new sets are juxtaposed to existing set groupings.

The second depiction views the life-cycle phases as mapping into a circle partitioned into five "pie-shaped" segments representing the life-cycle events. Now, "acceptance tesing" is adjacent to "conceptualization" and the cyclic nature of the development process is self-evident. Moreover, the center of the circle is common to all segments and represents the knowledge base that is common to all developers during all the phases. It is apparent that non-adjacent events may access, share and utilize the same information as adjacent events. This implies that the information be in a format that is usable by all parties and no party should be burdened with learning, for example, a new computer language to test the system. With this second depiction, it is possible to consider those tools conventionally construed narrowly as testing tools and treat these tools on a broader basis as tools influencing the very creation of the system ultimately to be tested.

SUMMARY OF THE INVENTION

The above-described shortcomings and limitations of the conventional methods for developing and then exercising an application system are obviated, in accordance with the principles of the present invention, by utilizing an emulation system environment that simulates the actual input/output interface of the application system. In this emulation environment, the user creates input/output transactions for eventual execution by the application system in a screen-driven, automated mode which is independent of and off-line from the application system.

In the application system, a transaction is broadly described as the supplying of information to an input screen format, the transmitting of the input information to the application system for execution, and the receiving of information on a corresponding output format in response to system execution. To generate a corresponding transaction in the emulation environment, the user: (i) calls into view a replica of the selected input format stored by the emulation system, populates the format fields with the input information, and then stores the filled-in format; and (ii) calls into view the associated output screen replica, supplies the anticipated application system responses to the appropriate fields, and then stores the filled-in output format. The series of transactions generated in this manner may then be passed to the application system for execution at a time determined by the user. The actual application system responses are then compared to the anticipated responses and, depending upon the results of the comparison, the next appropriate action is invoked.

A feature of the present invention is that the user operates in a familiar environment and no new languages, such as a test language, need to be learned. Moreover, anyone familiar with the application system formats may now formulate automated tests. Also, the off-line storage of the input/output filled-in screen replicas provide for repeatable exercising of the application system and the storage contents constitute self-documentation.

The organization and operation of this invention will be understood from a consideration of the detailed description of the illustrative embodiment, which follows, when taken in conjunction with the accompanying drawing.

BRIEF DESCRIPTION OF THE DRAWINGS

FIG. 10 depicts, in both pictorial and block diagram form, the display editor of FIG. 4;

FIG. 11 shows the alignment of FIGS. 11A and 11B;

FIGS. 11A and 11B are a depiction of the manner in which window buffers are linked on the buffer free list prior to allocation as well as the linkage among allocated windows on the display list associated with the display device 400 of FIG. 4;

FIG. 15 shows an example of the command menu definition table file of FIG. 12;

FIG. 20 is a flow diagram of the method for submitting the test prepared by the emulation process to the system under test and for receiving and comparing the results produced by the system under test to those stored via the emulation process.

DETAILED DESCRIPTION

To place in perspective the detailed description of the present invention, it is instructive to gain a basic understanding of both the manual and language-driven automated testing methodologies of conventional system testing arrangements. Accordingly, the first part of this detailed description discusses both of these methodologies as they are applied to the TIRKS system. This approach has the additional advantage of introducing terminology and notation that will aid in elucidating the various aspects of the present invention.

1. Conventional Arrangement

Figure 1:
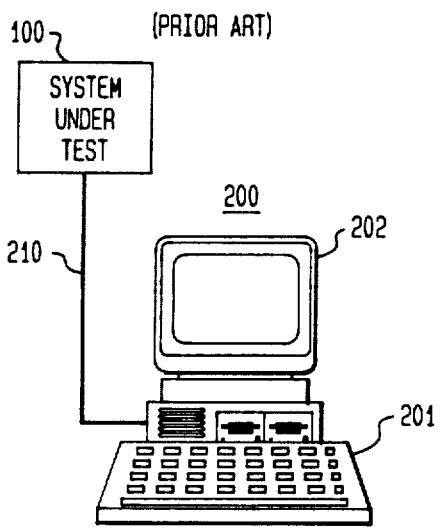
FIG. 1 depicts a conventional arrangement for implementing manual mode testing of a system under test.

Initially, as depicted in FIG. 1, the point of view taken is that of a system tester positioned at video display terminal (VDT) 200 and poised to operate in a manual mode. The system under test (SUT), such as the TIRKS system and as depicted by block 100, is accessible from VDT 200 via channel 210. Input information to SUT 100 is generally entered by the tester via keyboard 201 and output information is displayed in character or graphical format on video screen 202. Input is also displayed on screen 202 prior to transmission to SUT 100. A representative computer upon which SUT 100 resides is an IBM Model 3084 having the OS/MVS type operating system. Representative of VDT 200 is an IBM Model 3279 Terminal, which is connected to the Model 3084 via the 3274-type Controller also supplied by IBM.

Since a tester accesses SUT 100 via the usual or standard interface, that is, via VDT 200 and interposed channel 210, the tester must follow the same protocol and procedures as any other user. It is only the motivation and goals of each that differentiates the tester from the user and SUT 100 cannot discern those differences. The user is generally interested in providing real data to SUT 100 to produce usable results; the tester is not generally interested in results in themselves, but whether SUT 100 produces results in the manner intended.

In order to enable the tester/user to input data and receive output in a uniform manner, several types of so-called formats may be called into view on VDT 200. After turning-on VDT 200, and assuming SUT 100 is operational, the tester requests a format by spelling out, for example, /FOR, followed by the desired format, and then strikes the "ENTER" key on the keyboard, thereby transferring the request to SUT 100. As an example, it is supposed that the initial input to SUT 100 is a request to "log-on". For log-on, the tester must supply password information so that SUT 100 may determine if the tester is a valid user. Thus, if the tester types, for instance, the log-on format "gclogo" after /FOR, followed by the "ENTER" key, then the following response is returned by SUT 100 and displayed on screen 202 (the underbars indicate where a user is to make entries):

| DISPLAY 1 |  |
|---|---|
| *GOC LOGON/OFF* | |
| ENTER RRO : _ | |
| ENTER PASSWORD : _ | |
| PF KEY ASSIGNMENT | |
| 1: FIND | DISPLAY LOGON STATUS |
| 4: ADD | LOGON |
| 8: REFRESH | REFRESH SCREEN |

| DISPLAY 1 |  |
|---|---|
| 10: DELETE | LOGOFF |

The user supplied fields have the following meanings:
RRO - Responsible Reporting Office
(i.e., user identification)
PASSWORD - valid password to enable tester to access SUT 100
The information with the heading "PF KEY ASSIGNMENT" (PF implies Program Function) lists the allowed response keys which then initiate one of the following actions:
FIND - Displays requested RRO
ADD - Log-on to subsystem
REFRESH - Clear all fields on the screen
DELETE - Log-off subsystem It is supposed that the tester responds first by entering data in the two fields, namely, RRO is filled in with the three character string "DFB" and PASSWORD contains the six character string "PASSWD", and then the tester strikes the "PF4" key.

In general, screen display 202 may contain up to 1920 character positions as determined by 24 lines per screen at 80 characters per line. VDT 200 translates the characters as well as the character position information into a form suitable for transmission over channel 210. The striking of the "PF4" key by the tester signifies that the tester has completed the screen entries and that the character information is to be translated within VDT 200 and then transmitted over channel 210 to SUT 100.

If the information supplied by the tester at "log-on" is complete and accurate so that it is acceptable to SUT 100, the next response returned by SUT 100 to VDT 200 is as shown in DISPLAY 2, which is essentially DISPLAY 1 above augmented with the additional line (line of the display):

| DISPLAY 2 |  |
|---|---|
| *GOC LOGON/OFF* | |
| ENTER RRO : _ | |
| ENTER PASSWORD : _ | |
| PF KEY ASSIGNMENT | |
| 1: FIND | DISPLAY LOGON STATUS |
| 4: ADD | LOGON |
| 8: REFRESH | REFRESH SCREEN |
| 10: DELETE | LOGOFF |
| GC101011 LOGON SUCCESSFULLY COMPLETED. | |

By visually inspecting the response line, the tester is now ready to select the next testing activity. Since in this example the log-on attempt was successful, the tester will move to a next planned testing step, as discussed shortly. However, if the log-on was unsuccessful, another branch of the so-called testing tree must be traversed, such as a retry on the RRO and/or PASSWORD entries. If such information is known to be valid upon input and it is not being accepted by SUT 100, it may be necessary to contact the system developers to investigate the discrepancy between the expected and actual responses.

It is important at this juncture to reiterate and emphasize some characteristics to manual mode testing already encountered. First, the testing is interactive in that a tester supplies an input, evaluates a response, then supplies another input, and so forth. Testing is effected on-line and only when a tester is present. Also, any responses from SUT 100 must be visually interpreted from a full screen display of basically disparate, oftentimes scattered information, as demonstrated in more detail shortly. The screen information must be read and interpreted and, based upon an analysis, the tester decides which branch of the testing tree is most fruitful to pursue.

If it is presumed that log-on is successful, the tester now moves to the next testing iteration. For this step, a new format is to be called into view and then populated with data. Thus, after /FOR is displayed by the appropriate keystrokes, the tester types the name of the new format, now called "gcocml", and then strikes the "ENTER" key. SUT 100 responds with the requested format and it is displayed on screen 202. The tester now enters the data to exercise the various components of SUT 100 selected for testing. DISPLAY 3 below depicts the pertinent part of the "gcocml" screen as prepared by the tester just prior to transmission to SUT 100.

| DISPLAY 3 |
|---|
| /FOR_ *TIRKS ORDER CONTROL (MESSAGE)* |
| CLO: SLM _ ORD: B _ CKT: _ |
| ••••••••••••••••ORDER LEVEL•••••••••••••••• |
| ORD TYP: N SLS/ORIG: TWS _ CUST: TWS-DEMO _ RAG: _ |
| APP: 012086 DD/MDFR:021086 SWC: _ |
| WCO: _ ECO: _ TRO: _ OCO: _ CCO: _ |
| DOC: _ REL ORD: _ |
| ID: _ SID JEPS: _ _ SID: _ |
| ••••••••••••••••CIRCUIT LEVEL•••••••••••••••• |
| CMT: 001_ CID: 1001/df55ie/stlsmo01/m-/stlsmo02 |
| FMT: m ACTN: pa MOD: _ DR: msgis |
| CAC/TGAC: _ |

The unpopulated format screen comprises capitalized acronym fields followed by a colon; for example, "CLO", "ORD", "CKT", . . . , "APP", . . . , "MOD", "DR" and "CAC/TGAC" are the screen fields. Information following the fields comprise data entered by the tester; for example, "SLM" after "CLO", "B" after "ORD", "012086" after "APP" and "msgis" after "DR" are entries typed by the tester. Certain fields remain blank; for example, "CKT", "MOD" and "CAC/TGAC" from the above exemplary field list have no entries. When the unfilled screen is first received by VDT 200, the field entries usually have a series of underbars to indicate where data may be entered and the total length of acceptable data. For instance, "CLO" originally had six places reserved for data and three of these have been filled with "SLM". "CKT", which remains unfilled in this instance, has two places reserved for data.

It is not important at this juncture to define the meanings of the field acronyms. Rather, the concept to understand is that for each format appearance, fields are displayed with indicators as to the position and length of anticipated data, and the tester enters only that subset of data deemed appropriate to exercise SUT 100. After the tester is satisfied with the entries, the contents of screen 202 are transmitted to SUT 100 via an appropriate Program Function Key— "PF4" in the case of DISPLAY 2. Those keys utilized to transmit screen 202 information to SUT 100 are defined by the format implementer. In the case of DISPLAY 1, the allowed PF Keys were displayed to the tester. For the case of DISPLAY 3, the implementer chose not to display the possible PF keys. This implies that, besides a compendium of display formats, the tester must have readily available reference material that provides information regarding the keys acceptable for transmitting screen 202 to SUT 100 for those formats without an explicit display of the PF keys.

Upon submission of the contents of DISPLAY 3 to SUT 100, SUT 100 processes the contents and then responds to VDT 200 with the results, which are shown in pertinent part in DISPLAY 4 below.

| DISPLAY 4 |
|---|
| /FOR_ *TIRKS ORDER CONTROL (MESSAGE) * |
| CLO: SLM123 ORD: _ CKT: _ |
| |
| FMT: _ ACTN: _ MOD: _ DR: _ |
| CAC/TGAC: AXYZ123_ |
| |
| GC102A ADD SUCCESSFUL |

All field positions except "CLO" and "CAC/TGAC" are blank. The "CLO" field now has the original input entry "SLM" augmented with the three character data string "123" and "CAC/TGAC", which was blank upon input, now has the eight character data string "AXYZ123_". It is presumed for the present testing strategy that this returned data is not used immediately, but rather it is to be used as either input to other format requests or compared to results produced later in the test process from submission of other format requests. To save this data, the tester generally writes the data strings on a notepad so they are readily available for later comparisons. In addition to the field data, the message "GC102A ADD SUCCESSFUL" appears on line 24. This indicates to the tester that SUT 100 has processed the input format as anticipated. Other possible messages include, for example, "GC102E ORDER ALREADY EXISTS" or "GC103E INVALID CIRCUIT", and the next step in the testing is guided by the received message.

For the sake of expediency, it is supposed that the next test iteration utilizes a portion of the notepad data for input and compares the remainder portion to one of the output results. Again, the format called into view is "gcocml", and it is shown in pertinent part in DISPLAY 5 below just prior to transmission to SUT 100:

| DISPLAY 5 |
|---|
| /FOR_ *TIRKS ORDER CONTROL (MESSAGE)* |
| CLO: SLM123 ORD: _ CKT: _ |
| |
| FMT: _ ACTN: _ MOD: _ DR: _ |
| CAC/TGAC: _ |

All field positions except "CLO" are blank. The "CLO" field has the entry "SLM123" taken from the data listed on the notepad. In fact, the "CLO" field is treated as comprising two juxtaposed subfields, namely, "CL01" and "CL02", each storing a three-character string; in this particular example, "CL01" = "SLM" and "CL02" = "123". (This partitioning into subfields is utilized for automated testing and is mentioned now so the description of automated test script generation may be expeditiously discussed below).

When the first "gcocml" format, as shown in DISPLAY 3, was transmitted to SUT 100, the "PF4" key was utilized. This adds the screen data to the application system database. Now, to transmit DISPLAY 5 to SUT 100, the "PF1" key is stroked. This has the effect of finding a subset of the specific data in the application system database.

The information returned to screen 202 as a result of processing the contents of DISPLAY 5 is shown in pertinent part in DISPLAY 6, as follows:

---
DISPLAY 6
---
/FOR_ *TIRKS ORDER CONTROL (MESSAGE)*
CLO: _ ORD: _ CKT: _

.
.
CAC/TGAC:AXYZ123_

.
.
---

Only the field "CAC/TGAC" has an entry, namely the "AXYZ123_" string, and line 24 is blank. The tester now refers to the data saved on the notepad and compares the "CAC/TGAC" data displayed on DISPLAY 6 to that returned earlier in DISPLAY 4. In this particular case, the two data strings are identical, thereby indicating SUT 100 processed the add-find sequence as intended by the program developers.

Earlier in this subsection, certain fundamental characteristics of manual mode testing, such as the interactive, on-line and interpretative nature of testing, were summarized. With the descriptions associated with DISPLAYS 3-6 now completed, it is possible to elucidate the subtle, sometimes burdensome, aspects to manual mode testing.

First, there is no formal mechanism, short of notepad tabulations and rekeying, to input the results from prior test steps into later test iterations. Similarly, there is no convenient way to compare results generated from earlier screen inputs to succeeding screen outputs. Moreover, there is no mechanism to enter other types of data which might also be characterized as variable. For instance, in DISPLAY 3, the field "APP" conveys a date (month/day/year), generally the date of first access to the format with the specialized data entries, and the adjacent field "DD/MDFR" conveys the "APP" date plus a given number of working days (15 working days for DISPLAY 3). This implies that the user/tester must either compute or have tabulated the "DD/MDFR" date each time a corresponding "APP" date is entered.

From these characteristics it is realized that the so-called test flow and test data are inextricably bound in the manual testing mode. Test flow is loosely defined at this point as the set of unfilled input-output format pairs displayed in succession during a test sequence. For instance, unfilled versions of DISPLAYS 1 and 2 above form one pair of the set and unfilled DISPLAYS 3 and 4 form a second pair. Test data is the character information supplied to the positions following the individual acronyms defining the various fields.

It is now possible to contemplate a mechanized process that simulates various aspects of manual mode testing; the process may be characterized by: (1) the off-line storage of format pairs comprising the test flow; (2) successive calling into view unfilled formats; (3) filling the formats with data, either fixed or variable, and as might be stored from the processing of prior format requests; (4) submitting the combined test flow and test data to SUT 100 for step-by-step execution; and (5) the reporting of results in comparing data returned from SUT 100 to expected results. Accordingly, the remainder of this subsection describes one conventional type of automated procedure that effects such a mechanized process. As discussed in the Background Section, conventional automated procedures utilize a programming language; generally, it is a high-level language. This will be apparent as the description unfolds.

The approach taken to elucidate the principles of the language-driven automated test process is that of describing the program code written by a tester to exercise SUT 100 in the same manner as the above-described manual mode test example. During the description, reference is made to Appendix A, which lists the complete code corresponding to the manual mode test. Each line of source code has a numerical label to aid in the description; the label ranges from 1 through 47.

In particular, lines 1-10 of the code perform basically the initialization function of any high-level language. Thus, for instance, a universal program file ("com__defs" on line 2) is incorporated by reference into the code and certain dimensioned variables are defined (today and t_clo2, both of length 6, on lines 3 and 4). It should be emphasized that it is not expected that the full import of lines 1-10 be presently understood, but rather only the gist of their meaning is important for the immediate discussion.

Line 11 of the code equates "today" to a quantity obtained from a function call to an automated test system function designated "Ldatef()". Thus, the date need not be hard-coded into the test script and the date the code is executed will be substituted appropriately.

Line 12 calls a function that does other general run-time initialization.

Line 13 indicates the current format that may be considered to be in view of the tester—here the "gclogo" as per DISPLAY 1. Line 14 is a function that effects a series of steps, namely, the equivalent of the successive spelling out of /FOR, "gclogo" and the stroking of the "ENTER" key in the manual mode. Again, as per DISPLAY 1, the field acronyms are filled in appropriately on lines 15 and 16. To accomplish this, a compendium of formats is required so the acceptable field definitions may be gleaned. This compendium must be readily available since it is virtually impossible for the tester to have committed to memory all of the fields from the numerous formats. Moreover, the compendium will list the program function keys associated with each format. In this case, line 17 indicates the "PF4" key is selected, as was the situation in the manual mode test. Lines 18 and 19 show that the returned message (".msg") is to be compared to the depicted character string ("GC101 . . . COMPLETED") and if there is no match, an error function is called which prints an error message and the screen that is returned from SUT 100.

Comments similar to the above for lines 13-19 may be used to describe code lines 20-36, that is, the current format (line 20) treated as in view is defined and entered (line 21), certain fields (lines 22-35) are populated and then transmitted to SUT 100 (line 36). The correspondence of these lines to DISPLAY 3 is rather straightforward, except perhaps for lines 27 and 28. On line 27, the field "APP" is no longer hard-coded, but is defined by the "today" variable produced from an earlier function call (line 11). A second function "datey()" on line 28 increments the variable "today" by a given amount (15 days in this case) and is used so that test flow may be separated from test data.

In lines 37 and 38, temporary storage variables t_clo2 and t_cac store output data and serve as the equivalent of the notepad entries obtained from DISPLAY 4 above.

Lines 39 and 40 are used to compare the returned message to a string array (GC102_2) stored in an auxiliary file ("gocmsg").

Lines 41 and 42 correspond to DISPLAY 5 whereas lines 44 and 45 correspond to DISPLAY 6. There is no need, prior to line 41, to invoke a new format since the last called format (here "gcocml") is accessible until overwritten by another format call. The concatenation of the quantities defined in lines 41 and 42 form the field "CLO", as discussed earlier; this quantity is composed of fixed data "SLM" and variable data as stored in temporary location t_clo2. Upon reception of the results produced by processing lines 41-43, the first seven positions of the field "CAC/TGAC" (.cac on line 44) are compared to the temporary storage quantity t_cac. If these quantities do not compare, an error message is printed (lines 44 and 45).

Finally, line 46 provides a comment message within the script code and line 47 indicates the end of the test script definition.

Once the code is completed, the standard operations of compiling, linking, loading and then executing the code through a special driver interface to SUT 100 must be effected. If there are bugs in the test code, they must be found and corrected. The tester may spend significant time coding and debugging test code and the tester is diverted from the intended goal of exercising SUT 100.

This completes the description of manual mode and language-driven automated testing. The following subsection presents in overview fashion the principles of the testing aspects in accordance with the present invention. The same testing example is used as the vehicle to convey these principles.

2. Overview in Accordance with the Present Invention

In FIG. 1, the tester is viewed as communicating with SUT 100 in an interactive mode via VDT 200 which, in turn, maintains an on-line connection to SUT 100 over channel 210.

Figure 2:
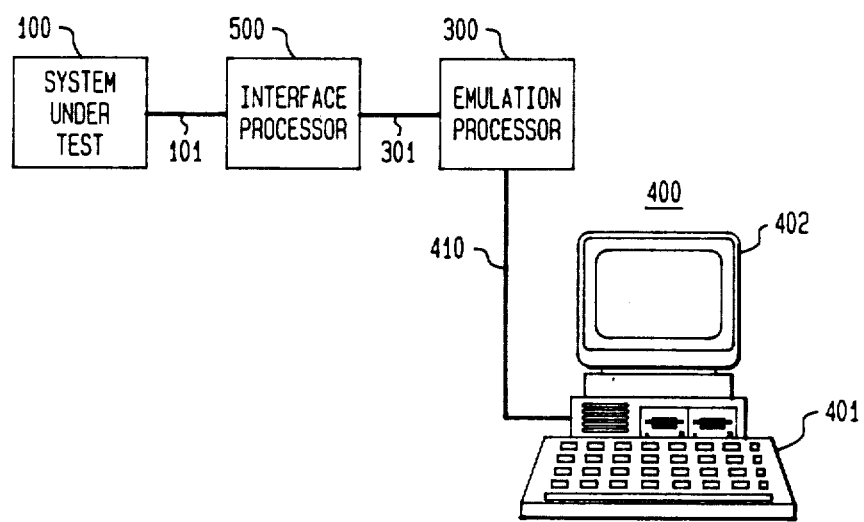
FIG. 2 depicts a screen-driven, automated testing arrangement, in accordance with an illustrative embodiment of the present invention, for exercising the system under test.

Now, with reference to FIG. 2, the tester is viewed as operating at another video display terminal, namely VDT 400, generally unrelated to VDT 200. VDT 400 is, in turn, connected to an independent, off-line emulation processor 300 via channel 410. Processor 300 provides a processing environment generally distinct from the environment of SUT 100, which is now referred to as the application environment of SUT 100. Exemplary of the combination of processor 300, VDT 400 and channel 410 is an IBM-AT personal computer running under control of the DOS operating system.

The processing environment provided by processor 300 emulates the interface subsystem of the application environment. The interface subsystem is that part of the application system that receives input format information over channel 210 as transmitted by VDT 200 and returns the output information via an output format to VDT 200 upon processing by SUT 100.

In the off-line processing environment, the tester may now create a test sequence—the combination of test flow and test data—in substantially the same operational mode as manual, on-line testing. Since the interface subsystem is emulated in the processing environment, the tester has the same capability of calling into view a desired input format and filling in the required fields as well as indicating the Program Function key used eventually to input the format to SUT 100. However, in addition, the tester can call into view the output format that should be returned upon correct processing by the application system, and the tester can populate this output format with the results expected when the input format is actually processed. A comparison of actual to expected results completes one input-output transaction in a test sequence.

For instance, with reference to DISPLAY 1 of the manual mode example, the tester requests, while in the emulation processing environment, a display equivalent to the "gclogo" format of DISPLAY 1. Information (RRO and PASSWORD) is provided by keystrokes to keyboard 401 of VDT 400. Once completed, the contents of the format, as present on screen 402, are stored in processor 300. The contents are stored in a form that allows the information to be actually conveyed from processor 300 to SUT 100, via interface processor 500 and links 101 and 301, at some future time for execution by SUT 100. The actual time of communication between processor 300 and processor 500, and ultimately SUT 100, is generally scheduled by the tester and is activated by processor 500 when the scheduled time is achieved. Processor 500 is typically an IBM 3270-type personal computer; line 101 is equivalent to line 210 of FIG. 1; and link 301 may be, typically, a RS 232 serial link.

In conjunction with supplying data to the "gclogo" input format, the tester also calls into view the "gclogo" output format and fills in the fields to produce the equivalent of DISPLAY 2. The contents of DISPLAY 2 are also stored in processor 300. Upon activation of SUT 100 by processor 500, SUT 100 processes the input as initially stored by processor 300 and then transmits the actual response as a corresponding output format to processor 500. Processor 500 then compares this response to the expected response as originally stored by processor 300. The action taken upon comparison is dependent upon the comparison results as well as the next iteration planned by the tester. Such considerations, however, are basically the same as in manual mode or language-driven automated testing arrangements.

The mode of testing in accordance with the present invention may be characterized as automated, screen-driven testing. Any user, including a tester, basically utilizes the formats that such a user is familiar with already. There is no need for the user to learn an additional programming language in order to exercise the application system. Sequences of screens to exercise the system are prepared off-line and stored for later execution. This creates a library of routines of both a repeatable and self-documenting nature, thereby further enhancing the ability to exercise fully the application system by all users in the development cycle.

In line with completing the present example, certain additional foundational concepts and terminology relative to screen-driven testing are now introduced; these will also prove to be beneficial in understanding the more detailed discussion in the sequel.

The input and output displays appearing on VDT 200 are called formats when referring to the application environment. The displays appearing on VDT 400 are designated as screens when discussing the emulation environment. Screens therefore comprise formats as well as other displays used to describe and prepare a test.

A test sequence is composed of a series of transactions; each transaction is the complete cycle of sending information to the application system and evaluating the returned information. From another viewpoint, a test sequence comprises the independent entities of test flow and test data; it is generally possible to run the same test flow with different test data. To completely specify a test sequence, both test flow and test data are required.

In the emulation environment, a transaction is generated by supplying information to three functional screens that are called serially into view; these are the CONTROL screen, the INPUT DATA screen and OUTPUT DATA screen. The latter two screens are equivalent, respectively, to the filled-in input format and the filled-in output format corresponding to the anticipated result. To demonstrate the utility of the CONTROL screen, DISPLAY 7 shows a completed CONTROL screen for the "gclogo" transaction.

| DISPLAY 7 *** CONTROL SCREEN *** | |
|---|---|
| INPUT SCREEN | gclogo_ |
| KEY | pf4 |
| OUTPUT SCREEN | gclogo_ |

The DISPLAY comprises three input fields shown in upper case. The data supplied by the tester (shown in lower case) provides sufficient information to allow processor 300 to display, first, the "gclogo" format for the input and, second, upon request, the "gclogo" format for the output. The required Program Function Key is conveyed via the "KEY" field.

The three unfilled, functional screens form three components to an entity generically referred to as a "set"; each screen is said to comprise a "set part". Other possible set parts to be discussed shortly include an INPUT NOTE screen and an OUTPUT NOTE screen. Thus, the test flow for each transaction in a complete test sequence is identified with a corresponding set. The complete test is then defined by an array of sets and, to be particular, a file called the SETARR file stores the array in processor 300 each time a test sequence is defined. Also, test data for each set is stored, in separate but associated files, within processor 300 for later recall and use. For instance, if the set associated with DISPLAYS 1 and 2 is labeled as set "2", then file "2.1" contains CONTROL screen information, file "2.3" contains INPUT DATA screen information and file "2.5" contains OUTPUT DATA screen information. To execute a test, the corresponding SETARR file and its associated set part data files are passed to processor 500. Processor 500 then parses and prepares these files for submission to SUT 100 and for comparison to results returned from SUT 100.

Since test flow and test data are stored in files, such file operations as listing of the files or modifying the files via an editor are readily comprehended. Such operations are supplied as system utilities and enhance the versatility of the preferred embodiment of the present invention.

With language-driven automated testing as illustrated by Appendix A, system functions are provided so that certain test data need not be hard-coded into the test sequence (for example, Ldatef() to obtain today's date). Similar function call capability is provided with screen-driven testing. To effect this in a screen-driven environment, the tester positions the cursor of screen 401 to the field in the displayed format selected to be filled in with run-time dependent data and requests, via appropriate keystrokes, that an overlay on the displayed format be called into view; this overlay is designated by the term EXPRESSION window in the illustrative embodiment. An overlay is used since functions, and more particularly, expressions, are generally longer than the actual field length. In the EXPRESSION environment, certain pre-defined functions may be called and expressions defined. In turn, the function or expression is substituted for the field data at run time. For instance, in the case of the APP field of DISPLAY 3, the field data is defined by the function "today". Also, the due date field (DD/MDFR) may be provided by the expression "today+15". Upon exiting the EXPRESSION environment, the tester is reminded that the APP field is defined by a function and that the DD/MDFR field is filled by an expression since a series of, for example, six "@" symbols appear in the data portion of the field.

Another feature included within the screen-driven emulation environment is the ability to associate variables with data fields or subfields. These variables provide the equivalent of notepad entries. The variables may be passed among sets of a test for comparison and input purposes. The environment to effect this association is called into view in essentially the same manner as in EXPRESSION window. This new environment is referred to as the VARIABLE environment. For instance, with reference to DISPLAY 4, the data of field CAC/TGAC is to be saved for comparison to the data returned in the same field of DISPLAY 6. Utilizing the VARIABLE window capability, data returned in CAC/TGAC on DISPLAY 4 may be stored in a variable quantity (e.g., t_cac as per Appendix A). The tester is reminded that a variable is associated with the field since the data portion of the field contains, for example, a series of "@" symbols. Later, as per DISPLAY 6, t_cac may then be used for comparison to the data returned in CAC/TGAC, and appropriate action undertaken based on the comparison.

The above overview presented the basic design philosophy of the screen-driven, automated development and testing system. The following section describes the operational flow of the system in accordance with the illustrative embodiment of the present invention.

3. Process Flow

Initially, the focus of the following description is on that part of the emulation process utilized to process the test characterized by DISPLAYS 1-6 presented in the previous subsections. Also, enhancements to the process, particularly aids to modifying the test, are incorporated in the description. Later, further refinements to the overall operation of the emulation process are disclosed.

Upon start-up of processor 300 of FIG. 2, a menu of action items is displayed to the user on screen device 402; the user is required to select an action item. The action menu in accordance with the preferred embodiment is as follows:

| DISPLAY 8 |
|---|
| _ CREATE |
| _ MODIFY |
| _ EXECUTE |
| _ EXIT |

To invoke the desired action item, the user places a specified keyboard symbol (e.g., Y for "yes") over the appropriate underbar and then sends a "display complete" signal (e.g., CONTROL E) to off-line processor 300.

DIALOG CONTROLLER 1000

Figure 3:
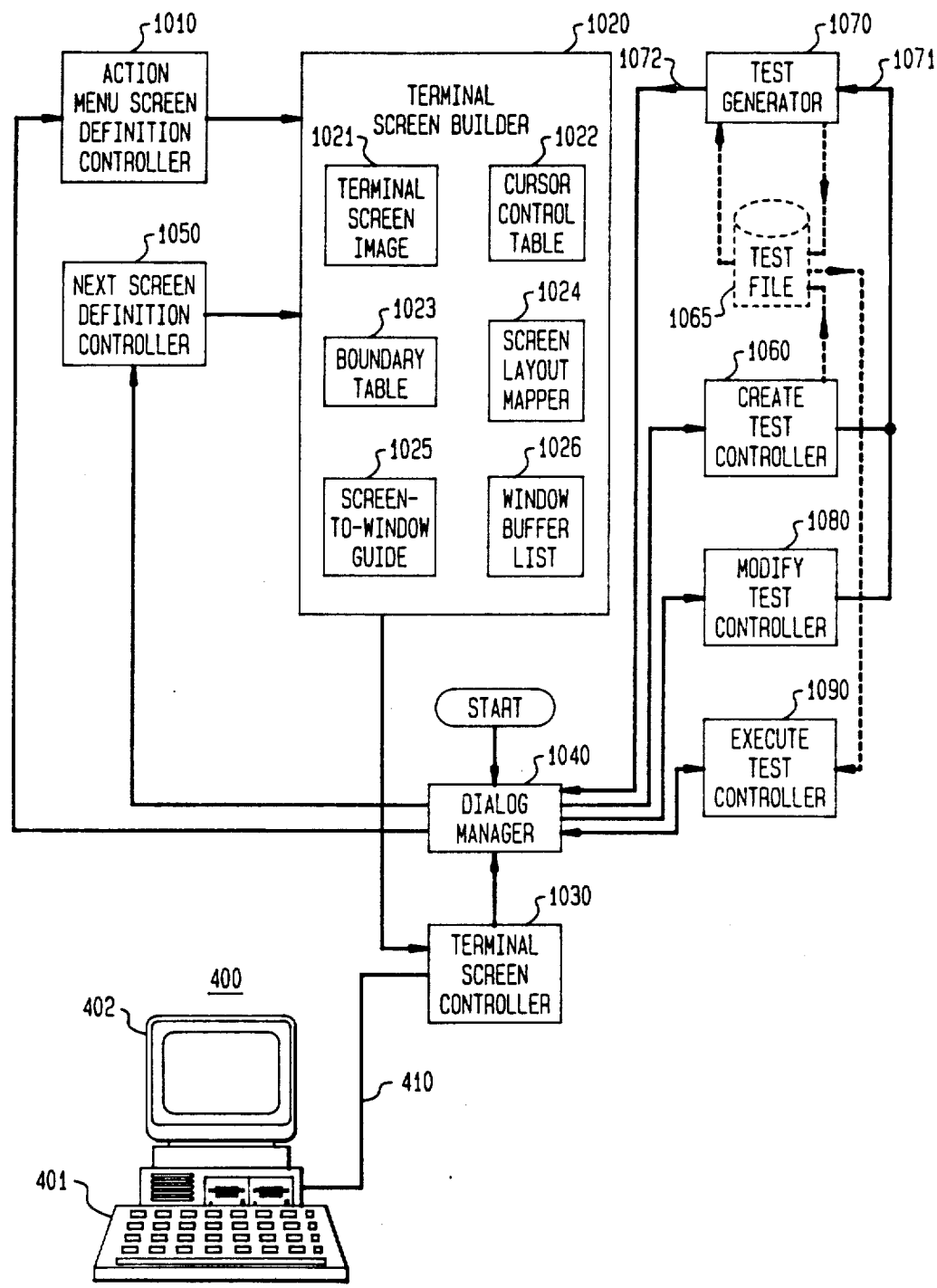
FIG. 3 is a block diagram of the dialog controller system within processor 300 of FIG. 2 which initially controls interaction with the user via terminal 400 shown in FIG. 2.

With reference to FIG. 3, dialog controller 1000 controls the action menu communication with the user. Upon start-up, controller 1010, which stores the unformatted contents of the action menu screen definition, passes these contents to terminal screen builder 1020 for formatting. The output of screen builder 1020 is then passed to terminal screen controller 1030 and, in turn, is conveyed from controller 1030 to VDT 4000 va channel 410 for display as DISPLAY 8 on screen 402.

Central to dialog controller 1000 is dialog manager 1040. Once the user has responded to the action menu request, dialog manager 1040 sets up for display of the information screen of the chosen action item.

If it is supposed that the user requests a CREATE action, that is, a completely new test sequence is to be created, then dialog manager 1040 conveys to next screen definition controller 1050 the need to format and display the CREATE information screen. The data required to generate the CREATE screen is then passed from controller 1050 to screen builder 1020 and, in turn, to screen controller 1030 for display to the user. The user then enters the required information which, for the illustrative embodiment, is the name to be associated with the new test, and dialog manager 1040 passes control to the action item's controller, in this case create test controller 1060.

create controller 1060 initiates (i) the creation of a basic SETARR file as well as an Initial set and a Final set, and (ii) the creation of a new test directory, identified by its user-defined name and which stores the SETARR file and associated data files. The Initial set is used to begin every test definition and comprises only a note screen that can be used to enter notes about the complete test sequence. The Final set is used to identify the end of every test and also comprises only a note screen. The test sequence as initially constructed is written to test file 1065, which is accessible to test generator 1070. Control is now passed from create controller 1060 to test generator 1070 and the user may begin to expand on the test definition existing at this point, namely, a skeleton SETARR file and Initial and Final set files; in the illustrative embodiment, test file 1065 resides on the hard disk of processor 300. The user is placed automatically into the "addset" mode, which means that after each new set is completed, another set will be readied for entry by the user. The user may end the "addset" with an appropriate command, as discussed below.

With respect to the remaining blocks in FIG. 3, controllers 1080 and 1090 correspond, respectively, to the MODIFY and EXECUTE options or modes on the action menu list. The operation of these controllers will be discussed in some detail alter. Also, embedded within screen builder 1020 are certain tables, a mapper, an image builder and so forth, as identified by indicia 1021-1026; the function of each of these blocks will be discussed when required.

TEST GENERATOR 1070

Figure 4:
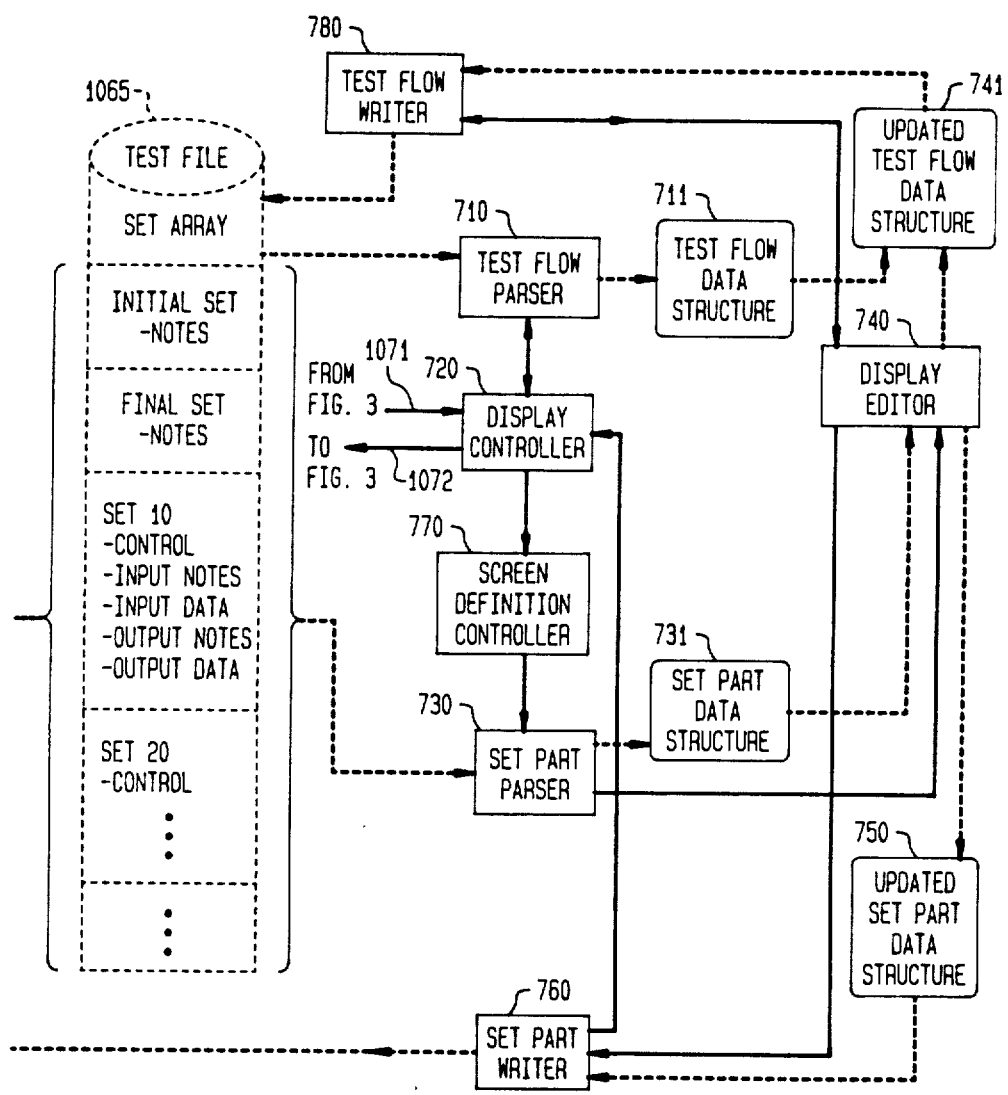
FIG. 4 is a block diagram of the test generator of FIG. 3.

The detailed composition of test generator 1070 is depicted in block diagram form in FIG. 4. Generated 1070 is used to complete the building of the screen-driven test sequence as initiated earlier by create test controller 1060 of FIG. 3. Each block of FIG. 4 and its interaction with the other blocks is discussed broadly now; and the make-up of the block is then treated in more detail.

The structure of the test as it resides in the set array portion of test file 1065 is brought into test parser 710 under control of display controller 720. As now illustrated, file 1065 contains the information for a completely built test, that is, besides the Set Array and Initial and Final Sets already created, other intermediate sets (e.g., Sets 10 and 20) are depicted. Although the intermediate sets have been shown now for completeness and reference purposes, they still must be created by the process soon to be described. Exemplary Set 10 is composed of five set parts, namely, CONTROL, INPUT NOTES, INPUT DATA, OUTPUT NOTES and OUTPUT DATA, which is generally the case. The results of parsing by test flow parser 710 reside in memory and a re represented by test flow data structure file 711. These results, as well as updated results from editing by display editor 740, comprise updated flow structure file 741 which is also stored in memory. The overall contents of file 741 are available to test flow writer 780 whenever a test flow "save" command is issued. The updated test flow is written to file 1065 via flow writer 780 under control of display editor 740.

Display Controller 720 also determines which sets and set parts are to be displayed, generally for editing purposes. The data for each set part is read in from file 1065 by set part parser 730. The data structures resulting from parsing reside in memory and are represented by set part data structure file 731. Display controller 7320, based upon information receives from test flow parser 710, provides to screen definition controller 770 the name of the screen layout, if any, that will be required to display the associated set part. The screen layout information is passed to set part parser 730 which builds the display from the layout and set part data of file 1065. Parser 730 builds the completed set part data structures and stores them in file 731. If any set part has been edited by the user, the updated set part data structures reside in memory, as represented by updated data structure file 750, and the updated set part is written to file 1065 by set part writer 760 when the "save" command is issued. After a "save", control may then be returned to display controller 720 and, in turn, to dialog controller 1000 of FIG. 3.

As indicated above, the test parser 710 extracts and then parses the test flow that is stored by file 1065. The test flow is represented by a set of structures that embody the test sequence. One such structure is an array of set information, which has already been designated SETARR for discussion purposes; it is basically a link list which controls the ordering of sets in a test sequence. Each link in the list contains information specific to the set it represents.

Figure 5:
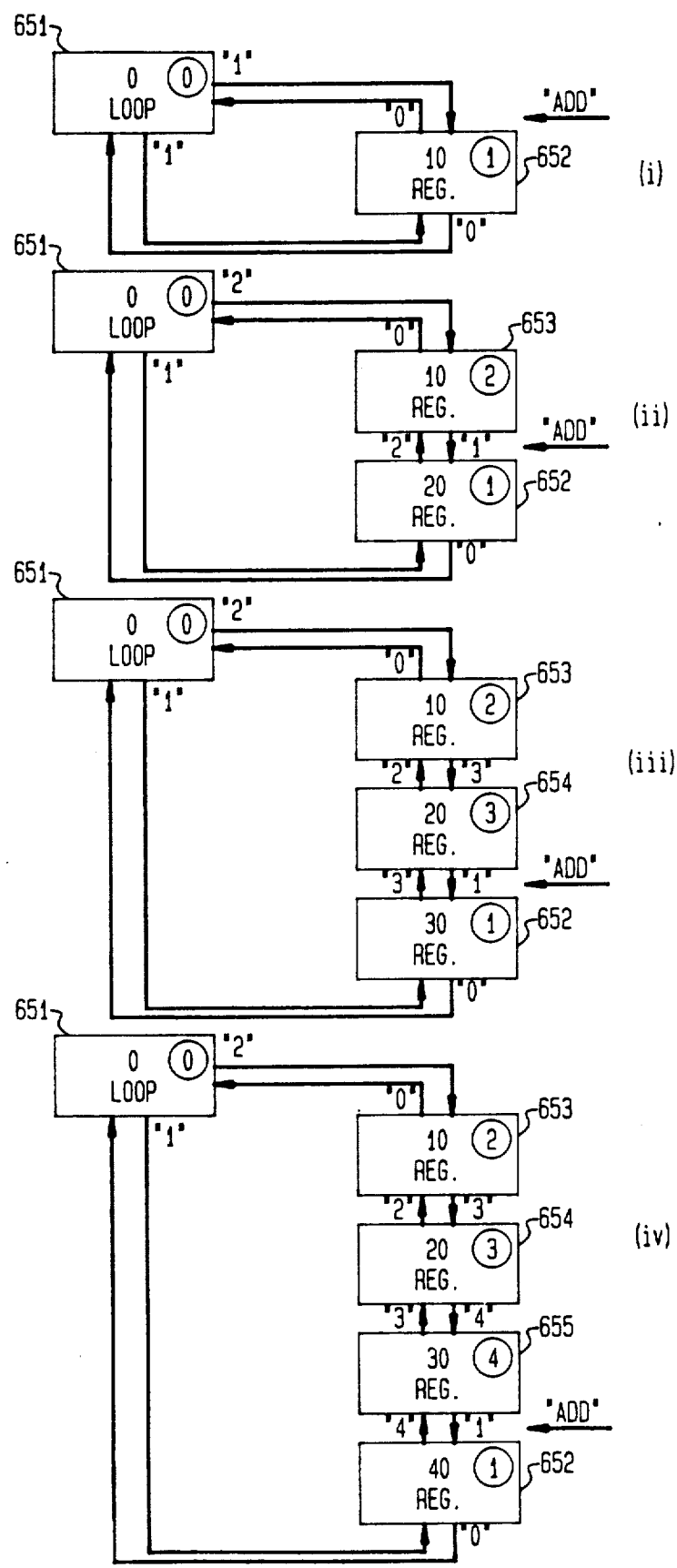
FIG. 5 depicts the manner in which new test sets are added to the test flow, including the linkages that uniquely define the test flow.

To demonstrate link usage as well as naming conventions employed in the illustrative embodiment, reference is made to FIG. 5. Line (i) of FIG. 5 depicts pertinent contents of the SETARR file upon entry to test generator 1070 (FIG. 4) immediately following a CREATE action menu selection.

Block 651 is representative of the Initial set whereas block 652 is indicative of the Final set. Each set has a number of identifiers associated with its corresponding block representation. One such identifier is the internal or fixed index, shown by an integer in a circle (e.g., block 651 depicts a zero in a circle, C(0), whereas block 652 is shown with a C(1). A second associated identified is the non-fixed or external index, shown by an integer in the block representation (e.g., block 651 contains a 0 whereas block 652 shows a 10). A third identifier describes the type of set represented by the block (.e.g, block 651 defines a LOOP set whereas block 652 describes a REGULAR set). In a test sequence, there is the possibility of other sub-loops besides the main loop; the Initial set is always the start of the main loop and is so indicated. Also, each block has both a forward and backward link to other blocks. The links fully describe the interconnection and hence the flow of the process. For instance, block 651 is linked in the forward direction to block 652, as shown by the "1" on the block interconnecting line. Each link is defined in terms of the internal index corresponding to the "to block" in a "from block-to block" interconnection. Similar comments apply to the backward link. A summary of the link list information is shown in TABLE I for line (i) of FIG. 5:

TABLE I

| BLOCK LABEL | FORWARD LINK | BACKWARD LINK |
|---|---|---|
| 651 | "1" | "1" |
| 652 | "0" | "0" |

Finally, with respect to line (i) of FIG. 5, a location pointer, depicted by the "ADD" label on the arrowed line, indicates the location of the next set to be added to the test flow; this set is actually the first set added by the user since the Initial and Final sets were generated by create controller 1060. In the example, the first set added represents the transaction of DISPLAY 7, namely the "gclogo-pf4-gclogo" transaction. Block 652, representing the Final set, has been "pushed-down" in the right-hand stack and block 653 has been interposed. The "ADD" pointer indicates the location in the SETARR of the transaction which will be added next in the sequence (in the exemplary test flow, the "gcocml-pf4-gcocml" transaction). The external indices have been adjusted (e.g., block 652 now has an external index of 20) whereas internal indices remain fixed (block 652 is still C(1)). Accordingly, the link list also changes, as summarized in TABLE II:

TABLE II

| BLOCK LABEL | FORWARD LINK | BACKWARD LINK |
|---|---|---|
| 651 | "2" | "1" |
| 652 | "0" | "2" |
| 653 | "1" | "0" |

Lines (iii) and (iv) of FIG. 5 depict, respectively, the test flow upon entry of the "gcocml-pf4-gcocml" transaction and then the "gcocml-pf1-gcocml" transaction. The link list of the final test flow of the example, as shown by line (iv), is as follows:

TABLE III

| BLOCK LABEL | FORWARD LINK | BACKWARD LINK | TRANSACTION COMMENT |
|---|---|---|---|
| 651 | "2" | "1" | Initial Set |
| 652 | "0" | "4" | Final Set |
| 653 | "3" | "0" | gclogo-pf4-gclogo |
| 654 | "4" | "2" | gcocml-pf4-gcocml |
| 655 | "1" | "3" | gcocml-pf1-gcocml |

With the naming convention established for the sets of a test flow, it is now possible to indicate the naming convention associated with the sets in the SETARR. As noted earlier, there are generally five set parts. Thus, for any set having an internal index X, the set parts and corresponding files are as follows: "X.1" for CONTROL; "X.2" for INPUT NOTES; "X.3" for INPUT DATA; "X.4" for OUTPUT NOTES; and "X.5" for OUTPUT DATA.

Referring again to FIG. 4, the operation of test generator 1070 was described in general terms and there was no attempt to distinguish the CREATE option from the MODIFY option of the action item menu. As shown in FIG. 3, create controller 1060 and modify controller 1080 both access test generator 1070 via the same path, namely path 1071, thereby indicating that processing by generator 1070 is substantially the same for either option. One key difference is tied to the "ADD" pointer discussed with reference to FIG. 5. This pointer is automatically "on" when entering test controller 1070 from the CREATE mode, whereas if the user desires to MODIFY a test sequence by adding a new transaction, the "pointer on" condition must be actively set by the user. This feature is important in that basically the same programming code may be utilized to process either option, thereby mitigating computer memory usage.

As alluded to earlier, display controller 720 has the responsibility of (i) initiating action by test flow parser 710 to obtain set information, starting with the Initial set, and then (ii) executing a continuous loop by calling set part parser 730 to sequentially process sets and associated set part values, again starting with the Initial set. The loop may be broken by the user whenever the user so desires. Upon return from parser 710, the first set part under scrutiny is the control set part of the Initial set. The loop advances, respectively, from this control set part to the input note set part, then to the input data set part, to the output note set part, to the output data set part, to the control information of the next set and so forth. Some of these may be bypassed at the discretion of the user or internal flow control. The next set is determined from the link list exemplified by TABLE III. If the current set part is an input or output data set part ("X.3" or "X.5"), then the format name embedded in the set array is used. Controller 720 passes this format name to screen definition controller 770 to determine if there is a valid format definition corresponding to the format name. When a match is achieved, set part parser 730 is called.

SCREEN DEFINITION CONTROLLER 770 and SET PART PARSER 730

Figure 6:
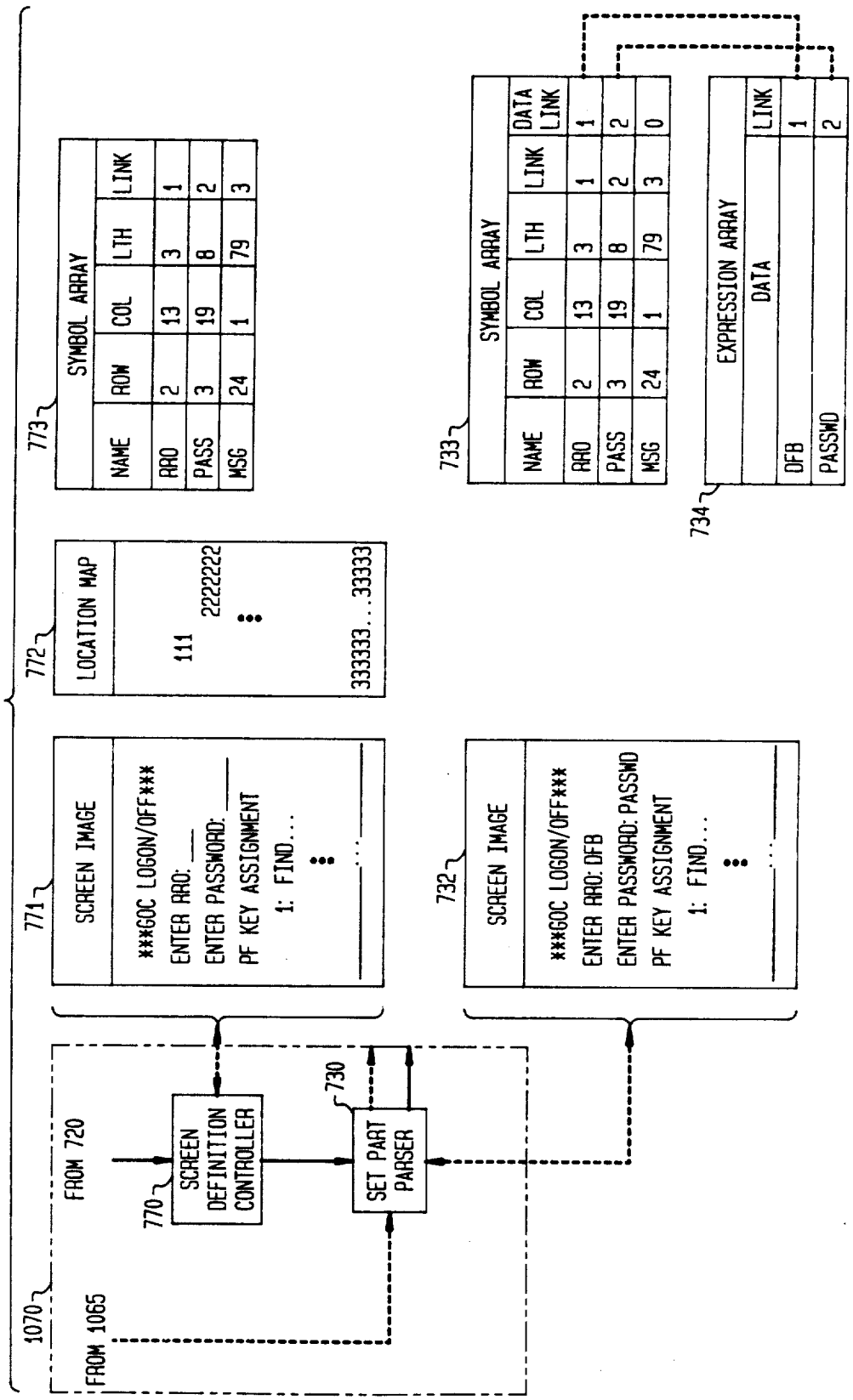
FIG. 6 depicts the information assembled by the screen definition controller and set part parser of FIG. 4 in order to produce an input data set part screen display.

Set part parser 730 builds different structures based on the type of set part being parsed. The first type considered is an input data set part. With reference to FIG. 6, which depicts pertinent blocks of test generator 1070, screen definition controller 770 receives the format name as provided by display controller 720. Screen controller 770 builds a skeleton screen image for the given format. In FIG. 6, it is presumed that the format corresponding to LOGON, that is, DISPLAY 1 from the previous subsection, is requested. Block 771 is representative of a memory buffer used to store the skeleton screen image. Associated with screen image buffer 771 are two other buffers, namely, location map 772 and symbol array 773. Map 772 depicts the locations reserved for the field entries. For instance, the first field of the LOGON format that is filled-in by the user is the RRO field. The three consecutive 1's in map 772 indicate the position as well as extent of the user-supplied data. Similarly, the third possible field to have entries is the "message" line or all of line 24 of the display. Symbol array 773 summarizes the information with respect to image 771 and map 772. For instance, in array 773, data for RRO is placed in row 2, column 13 of the format and is of length 3. The "link" column is an index on rows of symbol array 773 itself.

Control is passed from screen definition controller 770 to set part parser 730. Parser 730 reads in from file 1065 and checks to see if data has been supplied to this set part already (since the processing may result from a Modify request). Presuming that data is already present, parser 730 fills in the screen image, now depicted by block 732, for eventual display to the user. To find the information necessary to build screen image 732, symbol array 773 is augmented with data obtained from the corresponding set part to produce new symbol array 733. The additional data, in the "data link" column, gives the linkage necessary to extract the field data residing in expression array buffer 734. A data link entry of zero indicates there is no stored data in array 734. Thus, for this example, line 24 of the screen image 732 (the message line) is blank, whereas RRO, with a data link of one, stores the user-entered character string "DFB".

Figure 7:
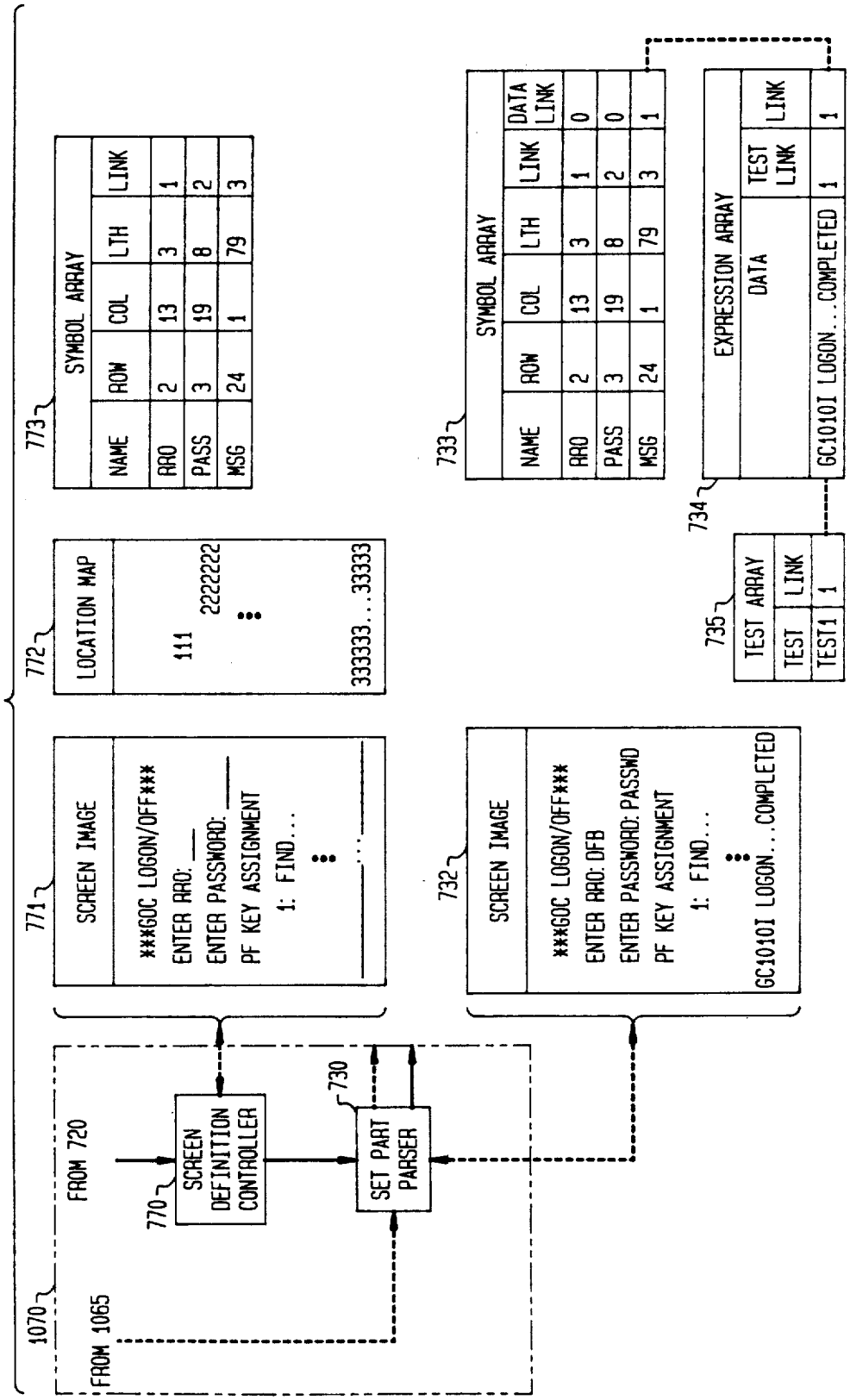
FIG. 7 depicts the information assembled by the screen definition controller and set part passer of FIG. 4 in order to produce an output data set part screen display.

The second type of set part considered for parsing is an output data set part; the parsing is shown symbolically in FIG. 7. The description of FIG. 7 follows the pattern of the description of FIG. 6 with the primary emphasis on the differences between FIGS. 6 and 7. In FIG. 7, the pertinent blocks of test generator 1070, namely, screen definition controller 770 and set part parser 730, are depicted. Screen definition controller 770 receives the desired format name as communicated from display controller 720 and then builds the skeleton screen image for the desired format. In FIG. 7, it is presumed that the format corresponding to DISPLAY 2 is requested. Block 771 now stores the skeleton screen image for the format of DISPLAY 2. In the manner described above with respect to FIG. 6, location map 772 and symbol array 773 are built in buffer memory.

After the skeleton screen image is built, control is passed to set part parser 730 from screen definition controller 770. At this point in the processing, set part parser 730 is used to read in data for comparison to data eventually returned from SUT 100 (FIG. 2) and build the appropriate data structures, namely, screen image 732, symbol array 733, expression array 734 and test array 735. Whereas in FIG. 6, the focus is on the RRO and PASSWORD fields, the focus of FIG. 7 is on the "message" or MSG field (the last line of this particular screen image). The data link column in symbol array 733 points to data that is compared against data returned in this field as a result of exercising SUT 100. In FIG. 7, the MSG field points to the data in link 1 of expression array 734 as the data to be used for comparison purposes.

The test link column in expression array 734 provides an index into test array 735. Each test named in test array 735 may be built from one or more field comparisons and test array 735 summarizes the comparison field list. FIG. 7 shows a link from expression array 734 to the single test named in test array 735, namely, TEST1. Thus, the interplay among arrays 733–735 is such that the data returned in the "message" field upon execution of SUT 100 is associated with TEST1 and, for this example, there is a single comparison of TEST1 data to the single data line in array 734.

Figure 8:
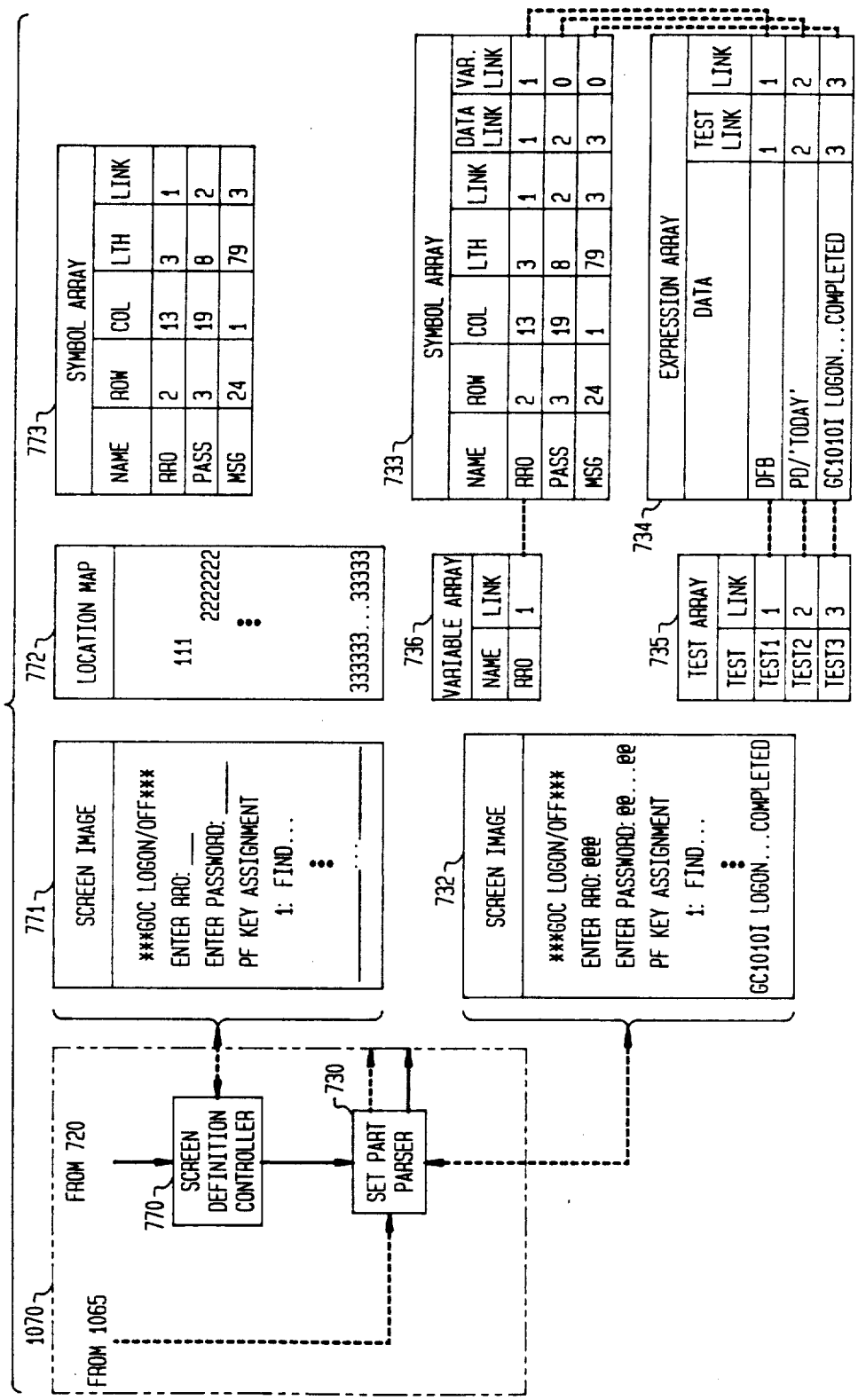
FIG. 8 depicts an expanded version of FIG. 7 wherein information supplied via VARIABLE and EXPRESSION windows are used to supply field data.

By way of generalizing the principles depicted in FIGS. 6 and 7 for the illustrative embodiment, reference is made to FIG. 8. In FIG. 8, an output set part for the LOGON format is considered. Focusing on the RRO field of screen image 732, it is seen that three "@" characters appear as field data. Cross-referencing arrays 733 and 734 leads to the conclusion that the data returned in the RRO field upon execution of SUT 100 will be compared to the character string "DFB". Based on previous discussion, it is expected that "DFB" character string would be displayed in screen image 732 rather than the "@" characters. However, as alluded to earlier, "@" characters are displayed whenever a variable or an expression is defined for field data. In this case, RRO is defined as a variable and this is evidenced by the addition of variable array 736 and the variable link column in symbol array 733. The data returned in field RRO may be used later, for example, as input to another format. The storing of data associated with variable array 736 provides the notepad function alluded to in the overview description.

In screen image 732, the PASSWORD field also contains a string of "@" characters. In this case, the "@" characters indicate that the data returned from SUT 100 is to be compared to an expression. This is discerned from cross-referencing arrays 733 and 734. In particular, the expression 'today' forms part of the PASSWORD and it will be evaluated at the run time of SUT 100.

Figure 9:
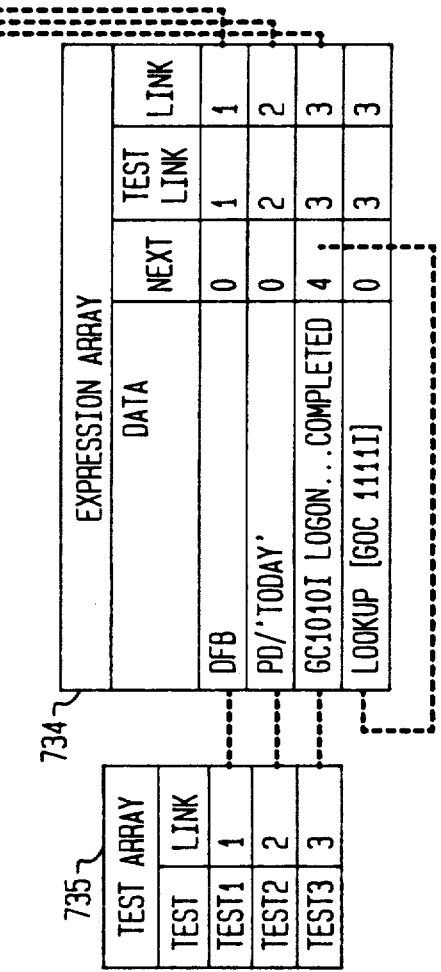
FIG. 9 illustrates the linkage between the expression and test arrays depicted generally in FIG. 7.

In FIG. 8, test array 735 has been expanded relative to the one shown in FIG. 7 since three fields are now used for test purposes. A further refinement to the emulation process, leading to the expansion of test array 735, is shown in FIG. 9 wherein the pertinent parts of arrays 734 and 735 are depicted. The situation depicted in FIG. 9 indicates that the first comparison of TEST3 is the entry of line or link 3 of array 734. To determine if there are any more comparisons for TEST3, the 'next' column in array 734 is addressed. In this case, there is another comparison at link 4 of array 734. The data entry of link 4 shows the field is to be tested against 'LOOKUP[GOC-11111]'. The 'lookup' command accesses a message file GOC and finds the string associated with the index 11111. It is also possible to indicate whether this array entry is to be ORed or ANDed to previous comparison results.

The last type of set part considered for parsing is either an input or output note set. The parsing is effected in a manner similar to that described with respect to FIGS. 6 or 7. Basically, screen image 771 is blank screen and screen image 732 is a display of the note data stored by file 1065.

DISPLAY EDITOR 740

Display editor 740 of FIG. 4 handles the display of a window, that is, the background screen plus any overlay, on device 402 of FIG. 3 as well as keyed in data from keyboard 401. Also, editor 740 processes updates of set part and set array data structures effected by the user during an editing session. The editing operation is accomplished either directly on the screen of device 402 or indirectly, via a SPECIAL WINDOW, overlayed on the screen of device 402. The mode selected depends on the type of change. Generally, the direct mode or the VARIABLE and EXPRESSION special windows are used to modify set part data structures and the COMMAND special window is utilized to change the contents and order of the test flow in the test data structures. The display on device 402 is built from a link list of window buffers; the order of the buffers in the link list shows the hierarchy of the window buffers. This hierarchy is used to determine those portions of the background screen and overlays that show through for each screen display.

A block diagram for display editor 740 is depicted in FIG. 10. Terminal screen builder 1020 and terminal screen controller 3030 have already been depicted in FIG. 1 as part of the action menu selection process. Both builder 1020 and controller 1030 are, in effect, subroutine-like processors that are accessed during various operations in the emulation process to perform the basic screen building and control functions.

Terminal screen builder 1020, utilizing window buffer list information associated with buffer block 1026, creates both the terminal screen image represented symbolically by block 1021 as well as blocks 1022-1025 which provide supplementary information utilized to manipulate the terminal screen image. With respect to the buffer list information encompassed by block 1026, FIG. 11 depicts the manner in which the window buffers are linked on the buffer free list prior to allocation as well as the linkage among allocated windows on the display list as they are prepared for display on screen 402. In particular, the window grouping of subset (i) of FIG. 11A shows three free windows on the window link list as well as the forward and backward pointer arrangements coupling the windows to the free list. Subset (ii) depicts the new state of the free list after WINDOW 1 has been extracted from the free list and placed on the window display list. The display list and its associated windows are also linked via forward and backward pointers. Two additional pointers, namely, CW and SCW point to the Current Window and Screen Current Window (that is, the main or underlying screen window) are also deployed to track overlays. In fact, subset (iii) of FIG. 11A depicts an overlay situation wherein two windows have been moved sequentially from the free list to the display list and wherein WINDOW 1 is the underlying window and WINDOW 2 is displayed in overlay fashion on WINDOW 1.

Subset grouping (iv) of FIG. 11B depicts that a special, stand-alone window, referred to as the SPECIAL WINDOW, may also be added to the display list whenever it is invoked by the user. A new pointer SW aids in tracking this overlay. The link lists for this situation are also depicted for both the free and display lists. Finally, grouping (v) of FIG. 11B depicts the buffer list arrangement prior to allocation of any windows off the free list and exhibits the stand-alone nature of the special window.

Again with reference to FIG. 10, screen image 1021 is built from screen text, such as described for FIG. 6, as well as stored information relating to the window size, window location and location map. Screen builder 1020 first builds a display for the top window of the overlays. The next window is checked for any locations that are not covered up by the top window. Each successive window is checked for any locations that are not covered by the windows on top of the window under consideration.

Cursor control table 1022 is built by using window location sizes, location map and symbol array to determine cursor protected positions and fields. A cursor protected position means that the cursor is not allowed to be placed in that location or position on screen 402. A protected field means the cursor may be moved into the location but a character may not be typed into the position on screen 402. For instance, an input note set part has a corresponding window with all screen positions and fields being unprotected since the user may type into any position on the screen. On an output data set part window, however, screen fields that are filled with "@" symbols are protected fields but not protected positions. The cursor may be moved to the field, but only control-like keystrokes are allowed.

Boundary table 1023 contains window boundaries that may not be crossed by the cursor.

Screen layout mapper 1024 stores the index into the symbol array (e.g., array 773 of FIG. 6) for a field on the screen display. The index is used in conjunction with screen-to-window guide 1025 to determine the actual symbol array entry. Screen-to-window guide 1025 comprises two types of information contained in tables. One table is used to find which particular window buffer goes with a terminal position on screen 402. A second table points to the symbol array in the window buffer associated with the location data.

COMMAND CONTROLLER 743

Command controller 743 of FIG. 10 controls communication with the user whenever it is necessary to perform such activities as terminating the automatic addition of new sets while in the CREATE mode, or while in the MODIFY mode, altering test data structures or positioning to some specific set part within the test sequence. When initiated by the appropriate keyboard entry (e.g., control-C) on keyboard 401, command controller 743 calls into view on device 402 an overlay window characterized by a four-line display; this window was referred to as the special window in the discussion of FIG. 11B.

Figure 12:
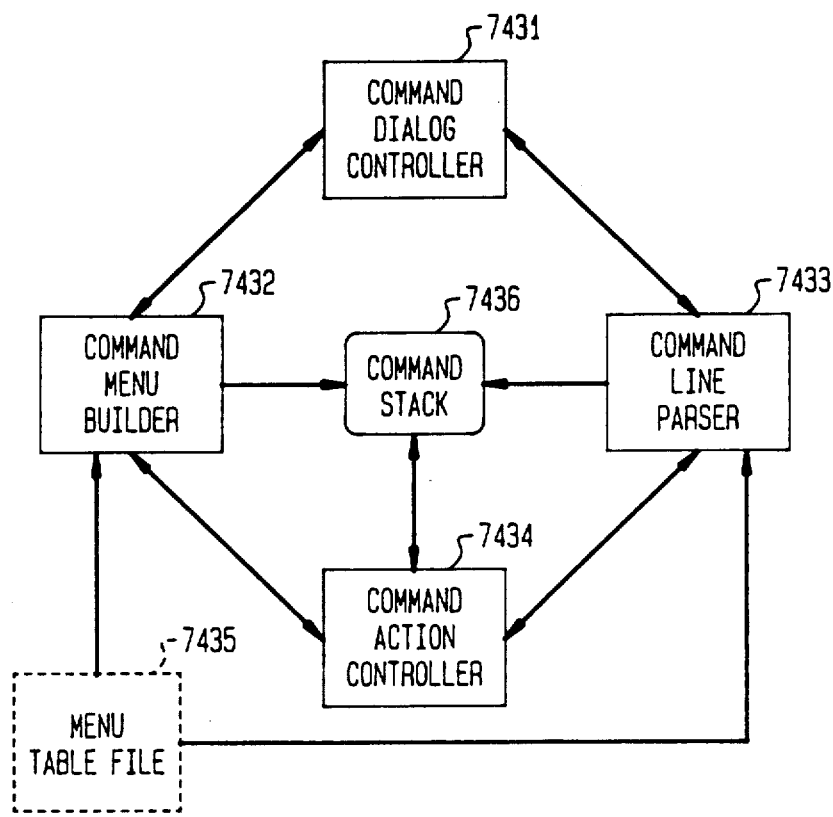
FIG. 12 depicts, in block diagram form, the command controller of FIG. 10.

In elucidating the operation of command controller 743, reference is made to FIG. 12. The four-line menu is built in command menu builder 7432 upon instruction from command dialog controller 7431, which serves as the interface to screen handler 742 of FIG. 10. In general, the command menu is composed of a top line called the "direct command" line, second and third lines called "selection" and "data entry", respectively, and a bottom "message" line. The lines comprising any command menu are supplied to menu builder 7432 from menu table file 7435, with the particular lines selected for display being dependent on the given user request.

Figure 13:
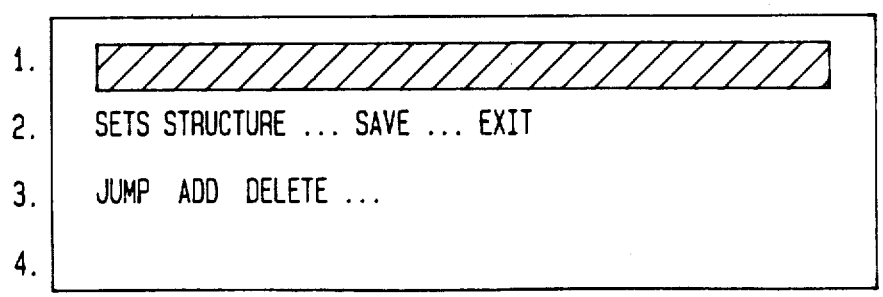
FIG. 13 shows an exemplary command window menu.

The initial command window that is built is displayed pictorially, in pertinent part, in FIG. 13. In FIG. 13, the "command" line is highlighted by cross-hatching (on an actual screen display the highlighting is accomplished, for example, by a light-on-dark display or blinking screen locations). The "selection" line and "data entry" line have descriptive token entries whereas the "message" line is blank. In other types of command window displays, the "data entry" line may have data entry positions adjacent to some or all of the descriptive tokens.

To demonstrate one prime processing function invoked from the command menu, it is supposed that the user decides that the test sequence of the illustrative example represented by DISPLAYS 1-6 defines the desired test. The user desires to end the automatic addition of sets in the CREATE mode and save the test sequence defined by DISPLAYS 1-6. It is recalled that DISPLAY 6 is the last output data set in the desired test sequence. To save the test sequence characterized by the SETARR file and the set parts associated with DISPLAYS 1-6, the user invokes the command window overlay on DISPLAY 6. To save the test flow and test data, the user positions the screen cursor to the "selection" field entry designated SAVE.

The user signals command dialog controller 7431, via a keyboard entry such as a carriage return, to process the SAVE "selection" entry. There is a so-called menu field number associated with the cursor position of each "selection" entry in the displayed window. This number is added to command stack 7436 in response to the carriage return and, in this particular case, the SAVE field number is the one placed on stack 7436. Control is then passed to command action controller 7434.

Command action controller 7434 controls the actual running of the desired request. Controller 7434 utilizes the information on stack 7436 to sequence the processing of command requests. In this case, the sole SAVE request is processed, and control is then passed back to command dialog controller 7431.

It is also possible to process a "selection" command as well as a "data entry" command by utilizing the "direct command" line. Thus, rather than positioning the cursor to the desired field in the "selection" line, the user may enter the desired command by directly typing the command on the top line of the COMMAND window display. For instance, the word SAVE could be typed in this top line and SAVE processing would then be effected. However, before the processing may be accomplished, it would be necessary to call command line parser 7433 in order to parse and thereby determine the appropriateness of the typed information. This direct entry capability is utilized to expedite command processing for experienced users.

As an example of certain other capabilities of command controller 743 which further illustrate its functionality, the technique for adding a regular set to an already defined test sequence is now considered. Such a situation is depicted by the transition between lines (i) and (ii) of FIG. 5. In the earlier discussion relating to FIG. 5, however, regular set 10 was added automatically because CREATE mode operation was assumed. Now, it is presumed that line (i) of FIG. 5 represents the complete test definition and the MODIFY mode is deployed to further define the test sequence.

The user, at the action menu level, requests the MODIFY mode and provides the requisite test name. The screen displayed in response to the user entries is the CONTROL screen for LOOP 0 (FIG. 5(i)). The user next invokes the COMMAND special window to display the command menu and control now resides in command controller 743.

Command controller 743 initializes command stack 7436 with the field number of the initial menu. This field number on stack 7436 is used to index an entry into menu table file 7435. Since this is the initial request for the COMMAND special window, command menu builder 7432 is invoked and the display represented by FIG. 13 is presented in overlay fashion on the already displayed CONTROL screen for LOOP 0.

Figure 14:
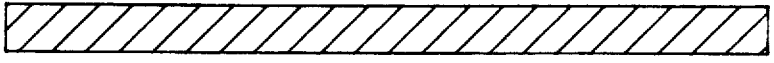
FIG. 14 depicts the correspondence among the command menu, the location map for the menu as well as the contents of the command stack of FIG. 12 and the highlight array.

To elaborate on the menu building process, reference is made to FIGS. 14 and 15, which depict, respectively, a more detailed version of FIG. 13 and the partial contents of menu table file 7435. In FIG. 14, the location map built by the command menu builder and associated with the initial menu is presented; as depicted, the field number associated with SETS is a 3, STRUCTURE corresponds to 5 and SAVE maps to an 8. The origin of this location map may be discerned with reference to FIG. 15. It is noted that the first entry in the "field number" column is a "1", and the text as well as the embedded field number associated with each text entry are shown in the top row of the next column. Thus, since the command menu builder initially receives and processes the first field number, as depicted in FIG. 14, the "selection" line is composed of the text on line 1 of FIG. 15. Moreover, by convention, the "data entry" line is composed of the tokens associated with the first entry on the "selection" line. In this case, the first entry is SETS, with a field number of 3. Cross-referencing field number 3 indicates that JUMP, ADD and DELETE are displayed on the "data entry" line whenever SETS is the highlighted selection entry or the "command" line is highlighted.

Figure 16:
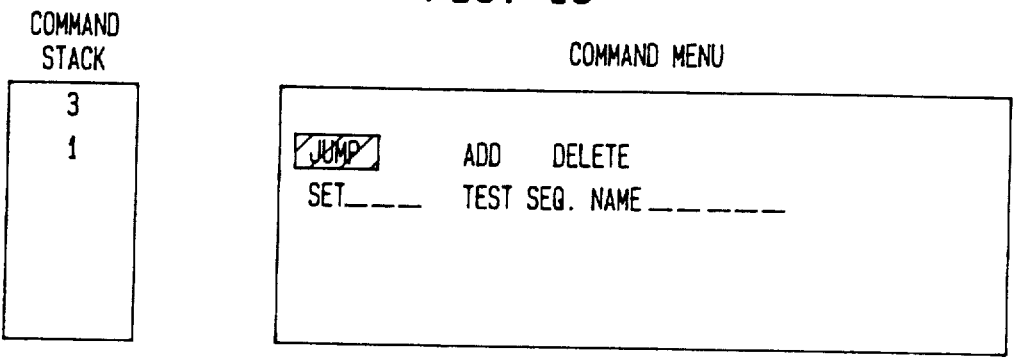
FIG. 16 shows the correspondence between the command menu and the command stack for a selected command.

Since the objective of this example is to add a regular set after set 0 (FIG. 5(i)), the user manipulates the initial menu display to select the SETS option in the menu (for instance, by operating the tab key). The user then strikes an appropriate key (e.g., ENTER) to indicate that an operation on SETS is to be performed. Command dialog controller 7431 appends the field number found on the location map at the cursor position, namely field number 3, to command stack 7436, as now depicted in FIG. 16. Also in FIG. 16, the old "data entry" line becomes the new "selection" line and the text in menu table 7435 associated with the JUMP option becomes the new "data entry" line, as may readily be comprehended with reference to FIG. 15, field number 10.

Since the user wishes to add a set, the cursor is positioned by the user to the token ADD. As the cursor is moved across the tokens in the "selection" line, the associated menu for the highlighted word on the selection line is placed on the "data entry" line. In this way, the user is alerted to the next level of menu options available if the pointed to item on the current level is selected.

Figure 17:
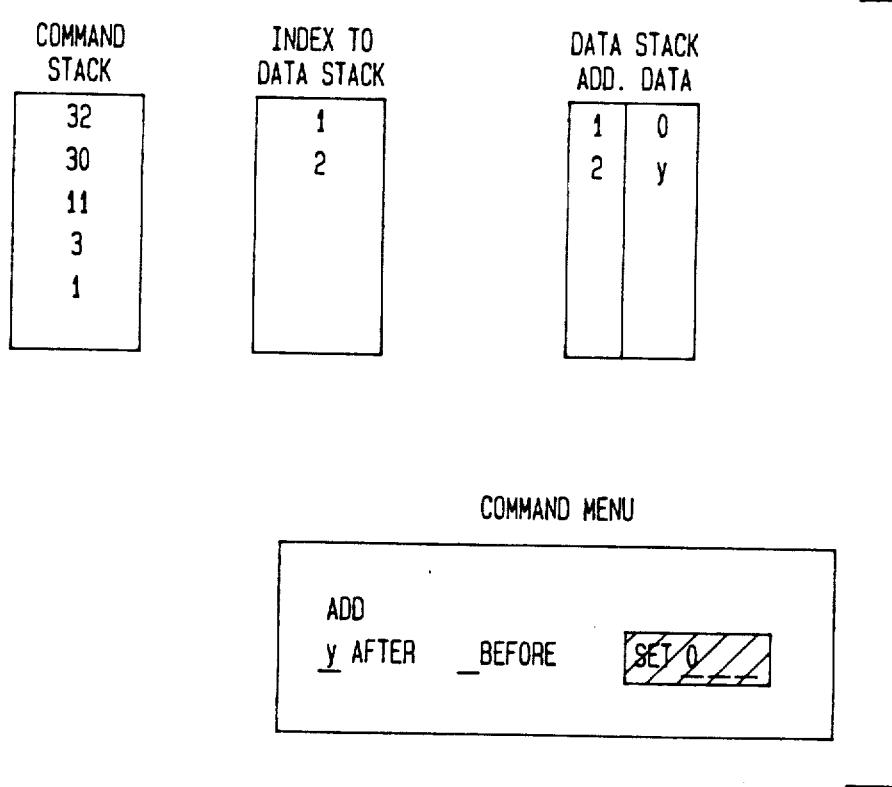
FIG. 17 further depicts the correspondence between the command menu and the command stack after a series of selected commands.

The user proceeds in the select-tab-ENTER mode through the various levels of the menu. Generally, at some point in the selection process, the user is required to enter data adjacent to "data entry" line tokens. This is the case in the present example, as depicted by FIG. 17, wherein the user desires to add a set after set 0, so the appropriate information is entered on the command display. The contents of command stack 7436 and the corresponding COMMAND MENU are given by FIG. 17. Moreover, two additional stacks, namely, the "data" stack and "index to data" stack are shown in FIG. 17. As the name implies, the latter stack stores a pointer to the actual data stored in the former stack. In FIG. 17, for example, the index stack points to location 2 of the data stack wherein "y" for yes is stored. The "y" represents the data placed before the token field AFTER in the displayed window of FIG. 17.

Once the user has completed the menu selection procedure and enters the appropriate information as required, control is passed to action controller 7434. Action controller 7434 accesses stack 7436 and commences processing the commands associated with the field numbers placed on the stack in top-down fashion.

As suggested in the foregoing discussion, the user may also enter commands directly without stepping through the various levels of the menu. Direct commands are entered on the first line of the command menu window.

Using the previous example, after the initial menu of FIG. 13 is displayed, the user enters the following information string on the "direct command" line:

SETS ADD AFTER 0.

Upon entry of the appropriate key stroke (e.g., ENTER), command controller 7431 recognizes that the user has entered a direct command and passes control to command line parser 7433. Line parser 7433 sequences through menu table file 7435 and compares each menu entry to the first word placed on the "direct command" line. If a match occurs, command line parser 7433, by emulating the actions of a user during menu selection, places the field number of the matched command on command stack 7436. Command line parser 7433 processes subsequent words or data on the "direct command" line in a similar manner until all words and data are handled. Each time there is a match, the actions of a user are emulated (e.g., cursor positioning and ENTER key stroking) exactly as with menu selection. However, the window displayed to the user is fixed, that is, there is no changing of data on the "selection" and "data entry" lines until after the "direct command" line is parsed.

If a match is not found between the word under consideration and any menu table entry, an error message is displayed on the "message" line of the command window. A user may also supply less than a complete command list and thereby skip forward in the series of menu displays that the user would otherwise step through individually.

WINDOW CONTROLLER 744

Window controller 744 of FIG. 10 serves a two-fold purpose. The first aspect pertains to the overall management of the window free list and the window display list as described earlier with reference to FIG. 11. The second aspect relates more particularly to the management of the EXPRESSION and VARIABLE special windows; these comprise two of the windows of the SPECIAL WINDOW block discussed generally with reference to FIG. 11B. A third window in the SPECIAL WINDOW category is the COMMAND special window described in the last subsection.

The manner of calling either the EXPRESSION or VARIABLE windows into view and populating the displayed window with information is substantially similar to the operation of the COMMAND special window. The EXPRESSION and VARIABLE windows are called into view in overlay fashion, generally onto an INPUT or OUTPUT DATA set part, to supply "expression" (e.g., today +15) or "variable" (e.g., t_c) information.

To invoke the window, the cursor is positioned to the field of interest and special keyboard entries are stroked (e.g., control-X and control-V for the EXPRESSION and VARIABLE windows, respectively). The appropriate window is overlayed proximate to the field under consideration. A typical VARIABLE window overlay has three lines of the form (commensurate to FIG. 13).

| OVERLAY DISPLAY |
| --- |
| add edit delete ... |
| [cb,ce] → "variable" |
| msg: _ |

The first or menu line provides a list of options that the user may sequence through to arrive at the option of choice. The second or definition line allows the user to type in the desired "variable" name. The [cb,ce] designation, (cursor begin, cursor end) provides the user with the capability of defining the variable for all or even a portion of the overall field length. For instance, if a field length is 10 positions, then the notation [3,6] designates only the third through sixth positions are associated with the particular defined variable. The following example of a definition line relates to DISPLAY 4 above:

[1,7]→t_cac.

The third or message line provides feedback to the user for instance, on allowed menu choices or error messages.

Storage of the information provided by a VARIABLE window has already been discussed with reference to FIGS. 6-9. It is recalled that information accepted as valid upon a call to a VARIABLE window is shown by a "fill" character (e.g., @) in the appropriate field positions upon exiting the window.

A typical EXPRESSION window overlay also has three lines generally of the form of the above OVERLAY DISPLAY; however, the definition line is now of the form

[cb,ce] "relation" "expression", where "relation" is an operation of the form "equal" "greater than", "not equal to" (=,>,!=) and so forth. Moreover, "expression" may be one from a standard set of system-supplied expressions such as "today" for the execution or run-time date. The handling of the EXPRESSION window information was also covered in the description of FIGS. 6-9. A field defined by an expression also has an appropriate "fill" character to indicate this fact.

4. Program Flow

The description in the foregoing section focused on the emulation processing methodology in accordance with the illustrative embodiment of the present invention. This section treats the corresponding program flow, that is, the detailed series of operational steps utilized to effect the process flow.

Figure 18:
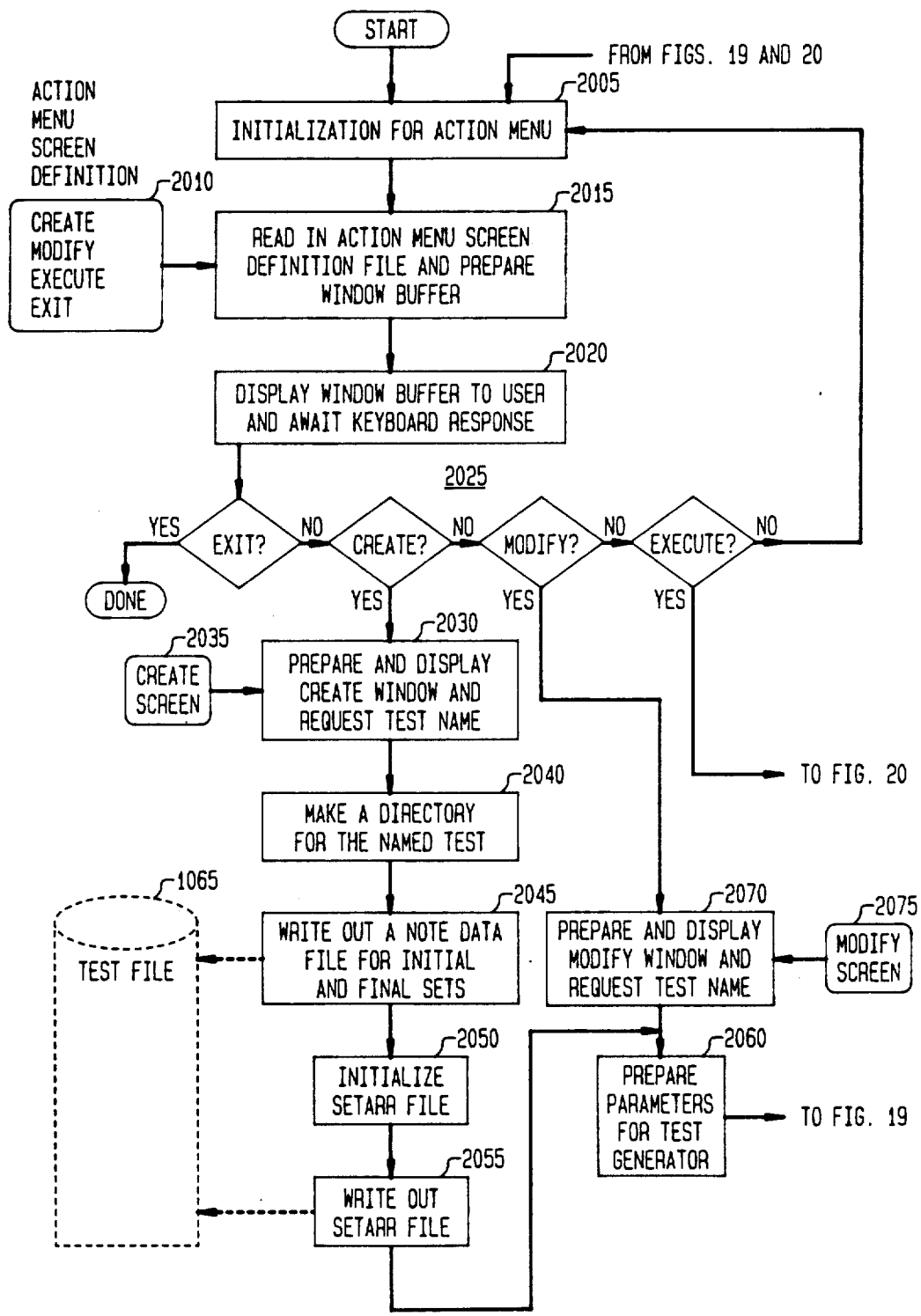
FIG. 18 is a flow diagram corresponding to the processing performed by the controller of FIG. 3.

In FIG. 3, dialog controller 1000 depicts the arrangement of processing blocks used to communicate with the user. FIG. 18 shows the flow diagram corresponding essentially to the processing performed by controller 1000 of FIG. 3. In FIG. 18, upon start-up, emulation process initialization is accomplished by code block 2005. For instance, arrays are restored to default values and screen 402 of FIG. 3 is cleared. After initialization, the action menu screen exemplified by DISPLAY 8 above is built by code block 2015 using data stored on-line by file 2010. The window buffer for the action menu is allocated as already discussed with reference to FIG. 11. The completed window buffer is displayed to the user via code block 2020. Decision block 2025 processes the keyboard entry by the user.

Supposing a CREATE request, code block 2030 prepares the next window displayed to the user. The format for the CREATE screen is contained in on-line file 2035. The user, in response to the CREATE display on the screen, types the name selected by the user to be associated with the test. This invokes: code block 2040 wherein a directory file with the test name is entered into the file structure; code block 2045 to write the Initial and Final Set data into file 1065; code blocks 2050 and 2055 to write out the skeleton SETARR file to test file 1065; and passing of control to code block 2060.

In the event the user selected the MODIFY mode, decision block 2025 directs control to code block 2070 wherein the MODIFY screen is created, using on-line file 2075, and displayed to the user. After the user supplies an already existing test name via the keyboard, control is also passed to code block 2060.

If the user selects the EXECUTE mode, control is passed to FIG. 20, which is discussed below.

Code block 2060 prepares the parameters needed by the next section of the code. The parameters depend on the manner in which code block 2060 is entered, that is, either from the CREATE mode or the MODIFY mode. For instance, if MODIFY is selected, then the command window menu is overlayed automatically on the next window displayed to the user. After parameter preparation, control is passed from code block 2060 to the program flow of FIG. 19. The flow of FIG. 19 corresponds basically to the processing effected by test generator 1070 of FIG. 4.

Figure 19:
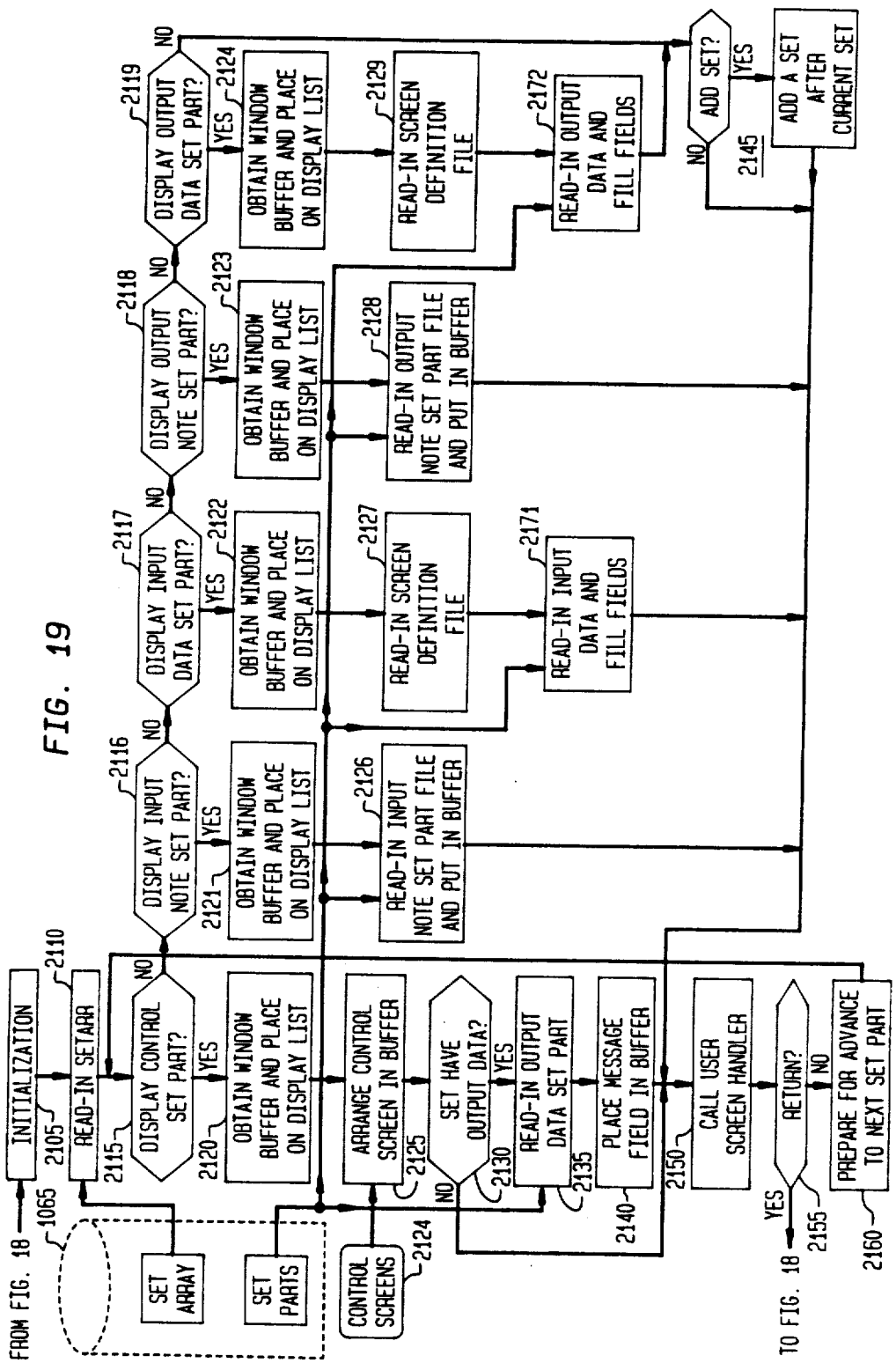
FIG. 19 is a flow diagram corresponding to the processing performed by the generator of FIG. 4.

After an initialization phase performed by code block 2105 of FIG. 19, control is passed to code block 2110. This code effects a reading-in of the SETARR file from file storage 1065. Supposing the CREATE mode, the SETARR file is a skeleton file with the structure represented by FIG. 5(i). The initialization performed by block 2105 would cause a "yes" response in decision block 2115, thereby invoking the allocation and display of the CONTROL screen via code blocks 2120 and 2125. The layout of the required LOOP CONTROL screen is provided by on-line storage file 2124.

The CONTROL screen for the Initial set allows the user to provide such information as the names of notepad-type variables that will be used in the test flow description. This is in contrast to the CONTROL screen for a REG set wherein the INPUT DATA and OUTPUT DATA formats as well as the "message" field comparison information are typical user entries. The manner in which the format information is embedded in the SETARR file is presented shortly; similarly, the techniques for storing the "message" field as set part data is also elucidated below. Code blocks 2130, 2135 and 2140 extract the "message" field from set part data whenever required by a particular CONTROL screen.

Again, presuming the CREATE mode, code block 2130 causes a branch to user screen handler code block 2150, thereby bypassing code blocks 2135 and 2140. Handler code block 2150, described in more detail below, processes user keyboard entries to the displayed control screen. If it is supposed that the defaults for the LOOP CONTROL screen are acceptable, such as no variables being defined, the user may invoke an immediate return from user handler 2150 (e.g. by using the EXIT command of the COMMAND special window). Code block 2155, coupled to code block 2150, allows the user to return to the action menu level. Supposing the user desires to continue in the CREATE mode, control is passed to code block 2160 wherein parameters are prepared in order to process the next set part. As a result of the parameters defined at this point, control is passed from block 2160 to code block 2145. This occurs since a LOOP set has only a CONTROL set part, which has already been displayed, so the "no" responses to blocks 2116-2119 are invoked, thereby leading to code block 2145.

Since the CREATE mode is under consideration, code block 2145 adds a set after the LOOP set, as represented by FIG. 5(ii). Control is passed from code block 2145 to code block 2115 via screen code block 2150 (not invoked yet since no user input is required), through return code block 2155 and preparation block 2160.

Control block 2115 yields a "yes" response as a result of parameters prepared in code block 2160. A REG CONTROL screen window is displayed to the user, via blocks 2120 and 2125 and file 2124. Since this set part is new, there is presently no data in OUTPUT DATA (in fact, the format of OUTPUT DATA is about to be defined on the REG CONTROL screen), so control is passed directly to screen handler 2150.

Using the example described previously, the data to be provided to this REG CONTROL screen is as presented earlier in DISPLAY 7, namely, the "gclogo-pf4-gclogo" transaction. Thus, the user enters this information on the REG CONTROL screen via the keyboard and handler code 2150 appropriately processes the information. Now, as control is passed from block 2150 through blocks 2155, 2160 and the "no" portion of blocks 2115 and 2116, the "yes" response path of block 2117 is traversed as a result of parameters prepared within block 2160 (namely, CONTROL screen has already been displayed and no INPUT NOTE data will be provided by the user). An appropriate display is built by code blocks 2122 and 2127, the latter having on-line access to all formats that may be requested by a user. In the instant case, the format displayed corresponds to the "gclogo" format of unfilled DISPLAY 1. In the CREATE mode, code block 2171 is bypassed since there is no pre-existing data stored in the set part portion of file 1065. However, in the MODIFY mode, code block 2171 is invoked to fill-in the display via the technique described with reference to FIG. 6. Control is then passed to screen handler code block 2150 to again process user responses. This time upon return from handler block 2150, control lodges in code block 2119. Following the "yes" path, the display corresponding to unfilled DISPLAY 2 is built by code blocks 2124 and 2129. Again, block 2129 has access to all formats that the user may wish to invoke. Before proceeding to user handler code block 2150, a determination regarding the need to add a new set is made in code block 2145. In the present case, a new set is added; it corresponds to the "gcocml-pf4-gcocml" transaction depicted in file structure form by FIG. 5(iii).

The processing by the code blocks of FIG. 19 continues, for the example, for two more iterations to cover the transactions represented by DISPLAYS 3 and 4 and DISPLAYS 5 and 6, respectively. As control is returned to screen handler code block 2150 after the third iteration, return code block 2155 is invoked. The test sequence presently embodied by the SETARR and set parts is written to file 1065 and the action menu is then displayed.

Canonic Form Representation of Set Array

As indicated above, both the SETARR and set part files are stored, in a so-called canonic representation, in file 1065. The canonic representation for the example test flow is now discussed.

The canonic form of LISTING 1 below is essentially the canonic representation for the exemplary SETARR file.

| LISTING 1 | |
|---|---|
| LINE | SETARR CANONIC FORM |
| 1 | (1007(2007 |
| 2 | (1022(1023 today) (1023 t—clo2) (1023 t—cac)) |
| 3 | (1006(2007 |
| 4 | (1018 0 0 −1) |
| 5 | '·····') |
| 6 | (2007 |
| 7 | (1002(2007 |
| 8 | (1018 2 10 3) |
| 9 | 'gclogo' 'pf4' 'gclogo')) |
| 10 | (1002(2007 |
| 11 | (1018 3 20 4) |
| 12 | 'gcocml' 'pf4' 'gcocml')) |
| 13 | (1002(2007 |
| 14 | (1018 4 30 1) |
| 15 | 'gcocml' 'pfl' 'gcocml')) |
| 16 | (1002(2007 |
| 17 | (1018 1 40 0) |
| 18 | ····· |
| 19 | ) |
| 20 | ) |
| 21 | )) |

In order to discuss the contents of LISTING 1, it is necessary to first introduce some terminology and notation. The basic building blocks of the canonical form are atoms and lists. An atom describes a unit which cannot be further subdivided. Atoms are combined into groups to form a list, and any list can be composed of other lists and atoms to form a hierarchical structure.

There are generally five types of atoms, namely: operators; numbers; string constants; variables; and defined references. Operators are positive integers. Numbers are integers that may be negative. A string constant is any group of characters surrounded by primes. A variable is any group of alphanumeric characters starting with a letter. Finally, a defined reference is a name that begins with a "." to indicate that it represents a symbolically defined screen address. For example, in LISTING 1: on line 1, the integer 1007 is an operator; on line 2, today is a variable; on line 4, −1 is a number; on line 9, 'gclogo' is a string variable. An example of a defined reference is shown in the set part listing presented shortly.

In a list, atoms and other lists are separated by spaces and surrounded by parentheses. Also, the first atom in a list is an operator. The operator is associated with an object and the operator acts as a tag and thereby indicates that the list is defining an instance of that object.

A simple example of operator tagging is provided by line 2 of LISTING 1; this line represents the storing of EXPRESSION and VARIABLE symbol table for these quantities in the SETARR. The operator 1022 is associated with a symbol table and operator 1023 is associated with a symbol table entry. In the line (1022(1023 today)(1023 t—clo2)(1023 t—cac)), the outer list operator (i.e.,1022) indicates that a symbol table is represented. Each of the three lists within the outer list represents the table entries.

As the canonical form is parsed, actions are taken as lists are recognized from the deepest nesting level outwards. Thus, in line 2 of LISTING 1, each symbol table entry is recognized first and then the symbol table operator is recognized. When a list is "recognized", a routine associated with the operator in that list is invoked. The components of the list are passed as parameters. If a component is an atom, it is passed directly. If a component is a list, then that list must first be replaced with the result of processing the list at parse time. Thus, with respect to line 2 of LISTING 1, the order of events is as follows:

(i) recognize the list (1023 today) and call the routine associated with symbol table entries. This routine has one input parameter, namely, today. As a result of processing, this entry will be created in the symbol table. The routine that built this entry passes back a pointer to the entry.

(ii) similarly, recognize the list (1023 t—clo2) and then the list (1023 t—cac), build entries and return pointers.

(iii) recognize the list (1022 pointer1 pointer2 pointer3) and call the routine associated with operator 1022. This routine takes a collection of pointers and groups them to create a complete symbol table. A pointer to the table is returned as the final result of parsing the list.

Now, by way of parsing the complete canonic form of LISTING 1, it is noted that the first innermost list appears on line 8 and has associated operator atom 1018. Atom 1018 is designated as a Property Operator (PROPOP) and its function is to return the internal index, the external index and the forward link of a set. Regarding line 8, the parameters are 2, 10 and 3, respectively, as summarized by block 653 of FIG. 5(iv). There are three other innermost lists as given by lines 11, 14 and 17, respectively, and the parameters returned correspond to blocks 654, 655 and 652 of FIG. 5(iv).

The first list at the next highest level appears on line 7 and has the associated operator atom 2007, called a LISTOP (List Operator). Its function is to return a list of atoms, which in this case comprises the numbers 2, 10 and 3 as well as the strings 'gclogo', 'pf4' and 'gclogo'. Three other LISTOPs appear at this level on lines 10, 13 and 16, respectively. It is noted that the last LISTOP, which corresponds to the FINAL set or block 652 in FIG. 5(iv), has blanks in the string constant positions.

The first list at the next highest level also appears on line 7 and has the associated operator atom 1002, called a REGSETOP (Regular Set Operator). Its function is to delimit the appearance of each Regular Set in the next highest list which is invoked by the next highest list atom 2007 on line 6. The LISTOP on line 6 returns all the information relating to lines 7 through 18 to the next level LISTOP appearing on line 3. Lines 4 and 5 also supply property information relating to the Initial Set to LISTOP 2007 of line 3. Also on line 3 appears the so-called LOOPOP (Loop Operator) having associated atom 1006. Its function is to associate all Regular Sets appearing as a result of the LISTOP processing of line 3 with this particular LOOP 0 (in this case, the only loop).

The highest level list has associated operator atom 1007, which designates the TSTFWOP (Test Flow Operator). Its function is to provide the complete test flow, including symbol table data and forward and backward links, when invoked. It is important to realize that the link data need not explicitly be set forth as part of the canonic form since this information can be deduced from the ordering and positioning of set information in the canonic form.

Canonic Form Representation of Set Parts

To exemplify the canonic form representation of set part data, the set parts corresponding to DISPLAY 3 and DISPLAY 6, namely set parts "3.3" and "4.5" are presented and discussed. Set part "3.3", in pertinent part, is shown in LISTING 2:

| LINE | LISTING 2<br>SET PART "3.3" CANONIC FORM |
|---|---|
| 1 | (1027(2007 |
| 2 | (1001(1009 .clo]) 'SLM') |
|  | . |
|  | . |
| 3 | (1001(1009 .app) today) |
| 4 | (1001(1009 .due_date) |
| 5 | (2008 today 15) |
|  | . |
|  | . |
| 6 | )) |

The operator atoms are as follows: 1027 - INOP (Input Operator); 2007 - LISTOP; 1001 - FASNOP (Field Assignment Operator); 1009 - FIOP (Field Operator); and 2008 - BINOP (Binary Operator). In parsing this canonic form, the innermost list is associated with BINOP atom 2008; its function is to perform the binary addition of the EXPRESSION variable 'today' generated at run time with the constant 15. The result is assigned, via FASNOP 1001, to .due_date, which FIOP 1009 indicates that this defined reference is to be associated with the "due-date" field (DD/MDFR) field of the present format. INOP 1027 defines the lists and atoms on lines 2-6 as an INPUT DATA set part.

The canonic form for set part "4.5" is shown in LISTING 3 as follows:

| LINE | LISTING 3<br>SET PART "4.5" CANONIC FORM |
|---|---|
| 1 | (1026(2007 |
| 2 | (1003(1011 TEST1) |
| 3 | (2007 |
| 4 | (1010(1009 .cac)"!=" |
| 5 | t_cac) |
| 6 | ) |
| 7 | ) |
| 8 | )) |

The new operator atoms are as follows: 1026 - OUTOP (Output Operator); 1003 - TSTOP (Test Operator); 1011 - TSPROP (Test Property Operator); and 1010 - TSPTOP (Test Part Operator). In parsing this canonic form, the innermost operator 1009 indicates that the defined reference .cac is to be associated with the "cac" field (CAC/TGAC) of the present format. TSPTOP 1010 indicates that the field returned by FIOP 1009 is to be compared to variable t_cac and an error message is to be generated if the test results in a "not equal" ("!="). The fact that a test is to be performed is indicated on line 2 by TSTOP 1003 and TSPROP 1011 enters this as TEST 1 in the test array file (see block 735 of FIG. 8) for the variable t_cac. OUTOP 1026 indicates that the set part canonic form is an OUTPUT DATA set part.

EXECUTE TEST CONTROLLER 1090

Execute test controller 1090, which has been shown generally in the block diagram of FIG. 3 and as a portion of the flow diagram in FIG. 18, is now shown in expanded flow diagram form in FIG. 20.

The so-called execution phase is initiated at the action menu level as one of the options selectable by the user. When invoked, with reference to FIG. 20, the user supplies a test name identified with the test sequence to be executed. It is possible to have many test files of the type exemplified by file 1065 resident on the storage medium associated with processor 300. The test name selected identifies the particular one to be prepared for execution. Block 2205 of FIG. 20 displays the blank "execute screen" passed from block 2206 and then processes user input.

Presuming a valid test is named, the canonic form representation from file 1065 associated with the test name is provided to interface processor 500 of FIG. 2 by the processing of block 2210. As depicted in FIG. 2, file 1065 may be transmitted to processor 500 via channel 301. As an alternative, if processor 500 is configured with a drive to read in diskettes, file 1065 may be advantageously copied to a diskette by processor 300 and then loaded into the disk drive of processor 500 for accessing purposes. In either case, processor 500 is typically an IBM 3270 PC running under control of the 3270 PC Control Program and utilizing the High Level Language Application Program Interface.

Once processor 500 is placed in control of the processing, the set array and set part data are read into memory and parsed by block 2215 of FIG. 20. Processor 500 is configured and programmed to translate the canonic form representation of a test into screen-image format data for transmission to SUT 100 of FIG. 2 via channel 101.

Upon parsing by block 2215, execution is initiated starting with the first set. Presuming the exemplary problem represented by DISPLAYS 1-6 is the test under consideration (the first set is a loop set and there are three other sets), then decision blocks 2216 and 2217 divert the processing to block 2230.

Loop set information and variable information are obtained from the CONTROL screen for the loop set, the variables are initialized and then decision block 2216 is again invoked. Since the three REG sets remain for the example, processing by block 2235 is now activated.

The processing by block 2235 provides the INPUT DATA to the input format by extracting the appropriate set part information from file 1065. The input format has already been obtained from the SETARR processing by block 2215. As part of the field fill-in process, certain EXPRESSIONS are evaluated within block 2240, the results of the evaluations as well as extracted set part data are filled-in by the processing of block 2245. Also, block 2250 saves data into variables for later use as notepad-type entries. With the input preparation completed, the program function key and the input format are transmitted as a coded channel signal to SUT 100 via channel 101 as represented by processing block 2260.

SUT 100 processes the input format as any other user input since the emulation and interface processing are transparent to SUT 100.

SUT 100 responds by transmitting a block of data representative of the processing by SUT 100 and this data block is stored by processor 500 as the "actual" result from processing the input format. In order to compare the actual to the "expected" results, block 2260 builds the output format from OUTPUT DATA stored by file 1065. Also, block 2265 saves data into variables for later use as notepad-type entries. The comparison processing occurs in block 2270 wherein actual and expected results are parsed for discrepancies between them and an error message file is written if any comparison fails.

Decision block 2275 provides the next-activity strategy desired by the user. For instance, some unsuccessful test comparisons may require that processing immediately terminate (YES) whereas others may lead to continued execution (NO). If there is no need to terminate, processing by the path starting with block 2235 and ending with block 2270 is again effected through the last set or until a fatal error occurs.

In the event that processing terminates, either by completing the submission of all the sets or as a result of unsuccessful comparisons, processing by block 2220 is invoked. The message file obtained by exercising SUT 100 is transferred to processor 300 and control is then passed to processor 300. The user may desire to see the file at this time or continue with another named test. Decision block 2221 provides this capability.

After execution, the user is transferred back to the action menu level as set forth in FIG. 18. The user is ready for another iteration or may exit the emulation process, as appropriate.

While this invention has been described and shown with reference to an illustrative embodiment thereof, it will be understood by those skilled in the art that changes in form and detail may be made therein without departing from the spirit and scope of the invention.

APPENDIX A

```
1.  /* initial set */
2.  #include "com_defs"
3.  str today(6);
4.  str t_clo2(6);
5.  str t_cac(7);
6.  #auxdef gocmsg "gocmsg.x"
7.  Lusrmain(ac,av)
8.  int ronly ac;
9.  str ronly av() [ac];
10. {
11.    today = Ldatef("$M$D$Y");
12.    scriptst();
13.    #curmask "gclogos.z"
14.    get("gclogo");
15.    .rro = "DFB";
16.    .password = "PASSWD";
17.    Lxmit(k_pf4);
18.    if ( [.msg] != "GC101011 LOGON SUCCESSFULLY COMPLETED" )
19.         { error(1,10); }
20.    #curmask "gcocmls.z"
21.    get("gcocml");
22.    .clo_1 = "SLM";
23.    .order = "B";
24.    .ord_type = "N";
25.    .sls_orig = "TWS";
26.    .customer = "TWS-DEMO";
27.    .app = today;
28.    .due_date = datey(today,15);
29.    .wco = "WRO";
30.    .sid = ".";
31.    .item_1 = "001";
32.    .circuit_id = "1001/DF55IE/STLSMO01/M-/STLSMO02";
33.    .fmt_1 = "M";
34.    .action = "PA";
35.    .dr = "MSGIS";
36.    Lxmit(k_pf4);
37.    t_clo2 = [.clo_2];
38.    t_cac = Lsubstr([.cac],0,7);
39.    if ( [.msg] != gocmsg.GC102_2 )
40.         { error(1,20); }
41.    .clo_1 = "SLM";
42.    .clo_2 = t_clo2;
43.    Lxmit(k_pfl);
44.    if ( Lsubstr([.cac],0,7) != t_cac )
45.         { error(1,30); }
46. /* final set */
47. }
```

What is claimed is:

1. In a processing system having a processing system environment and comprising a processor, a keyboard, a display device and a storage medium, a method for creating an input-output transaction executable by an autonomous, screen-driven computer application system having an input-output interface environment, the input-output transaction being created by a user of the systems, said method comprising the steps of emulating said input-output interface environment by replicating said input-output interface environment in the processing system environment, said interface environment including a plurality of emulated input screen formats and emulated output screen formats from the application system, each of said input formats and said output formats being individually callable into view on the display device by the user so that said processing system is operational even if said application system is inoperative, upon a keyboard entry by the user, displaying on the device a selected one of said emulated input screen formats, supplying input information to the device from the keyboard by the user in accordance with said displayed emulated input screen format, processing said input information with the processor to obtain processed input information, storing said processed input information in the storage medium, upon another keyboard entry by the user, displaying on the device one of said emulated output screen formats in correspondence to said selected one of said emulated input screen formats, supplying output information to the device from the keyboard by the user in accordance with said displayed emulated output screen format, processing said output information with the processor to obtain processed output information, and storing said processed output information in the storage medium, wherein the input-output transaction comprises a combination of said processed input information and said processed output information stored in the storage medium.

2. The method as recited in claim 1 wherein said step of emulating comprises the step of storing in the storage medium display data representative of said emulated input screen formats and said emulated output screen formats.

3. The method as recited in claim 2 wherein each step of displaying said selected one of said emulated input screen formats and said selected one of said emulated output screen formats comprises the step of converting within the processor said display data representative of said selected one of said emulated input screen formats and said selected one of said emulated output screen formats to a form adapted for display by the device.

4. The method as recited in claim 1 wherein said step of processing said input information comprises the step of converting said input information to a form executable by the application system and said step of processing said output information comprises the step of converting said output information to a form executable by the application system.

5. The method as recited in claim 4 wherein said step of converting said input information includes the step of translating said input information to a canonic form representation, and said step of converting said output information includes the step of translating said output information to a canonic form representation.

6. In a processing system having a processing system environment and comprising a processor, a keyboard, a display device and a storage medium, a method for creating an input-output transaction executable by an autonomous, screen-driven computer application system having an input-output interface environment, the input-output transaction being created by a user of the systems, said method comprising the steps of emulating said input-output interface environment by replicating said input-output interface environment in the processing system environment, said interface environment including a plurality of emulated input screen formats and emulated output screen formats from the application system, each of said input formats and said output formats being individually callable into view on the display device by the user so that said processing system is operational even if said application system is inoperative, upon a keyboard entry by the user, displaying on the device a selected one of said emulated input screen formats, supplying input information to the device from the keyboard by the user in accordance with said displayed emulated input screen format, processing said input information with the processor to obtain processed input information, storing said processed input information in the storage medium, upon another keyboard entry by the user, displaying on the device one of said emulated output screen formats in correspondence to said selected one of said emulated input screen formats, supplying output information to the device from the keyboard by the user in accordance with said displayed emulated output screen format, processing said output information with the processor to obtain processed output information, and storing said processed output information in the storage medium, wherein said step of processing said input information comprises the step of partitioning said input information into an input flow part and an input data part and said step of storing said processed input information comprises the steps of allocating distinct input storage locations in the storage medium for said input flow part and said input data part and then saving said input flow part and said input data part in a canonic form in their respective locations, and wherein said step of processing said output information comprises the step of partitioning said output information into an output flow part and an output data part and said step of storing said processed output information comprises the steps of allocating distinct output storage locations in the storage medium for said output flow part and said output data part and then saving said output flow part and said output data part in a canonic form in their respective locations, and wherein the input-output transaction comprises a combination of said processed input information and said processed output information stored in the storage medium.

7. In a processing system having a processing system environment and comprising a processor, a keyboard, a display device and a storage medium, a method for creating an input-output transaction executable by an autonomous, screen-driven computer application system having an input-output interface environment, the input-output transaction being created by a user of the systems, said method comprising the steps of emulating said input-output interface environment by replicating said input-output interface environment in the processing system environment, said interface environment including a plurality of emulated input screen formats and emulated output screen formats from the application system, each of said input formats and said output formats being individually callable into view on the display device by the user so that said processing system is operational even if said application system is inoperative, upon a keyboard entry by the user, displaying on the device a selected one of said emulated input screen formats, supplying input information to the device from the keyboard by the user in accordance with said displayed emulated input screen format, processing said input information with the processor to obtain processed input information, storing said processed input information in the storage medium, upon another keyboard entry by the user, displaying on the device one of said emulated output screen formats in correspondence to said selected one of said emulated input screen formats, supplying output information to the device from the keyboard by the user in accordance with said displayed emulated output screen format, processing said output information with the processor to obtain processed output information, and storing said processed output information in the storage medium, wherein each of said emulated input screen formats and said emulated output screen formats is composed of a plurality of fields and said step of supplying input information includes the steps of selecting certain of said fields as selected input fields and assigning expressions executable by said processing system to said selected input fields, said expressions associating data with said selected input fields upon execution by said processing system, and said step of supplying output information includes the step of selecting certain of said fields as selected output fields and assigning expressions executable by said processing system to said selected output fields, said expressions associating data with said selected output fields upon execution by said processing system, and wherein the input-output transaction comprises a combination of said processed input information and said processed output information stored in the storage medium.

8. The method as recited in claim 7 wherein said step of supplying input formation further includes the step of choosing certain of said fields as chosen input fields and assigning variables to said chosen input fields, said variables being equated to data defined by said chosen input fields, and wherein said step of supplying output information further includes the step of choosing certain of said fields as chosen output fields and assigning variables to said chosen output fields, said variables being equated to data defined by said chosen output fields.

9. In a processing system having a processing system environment and comprising a processor, a keyboard, a display device and a storage medium, a method for creating an input-output transaction executable by an autonomous, screen-driven computer application system having an input-output interface environment, the input-output transaction being created by a user of the systems, said method comprising the steps of emulating said input-output interface environment by replicating said input-output interface environment in the processing system environment, said interface environment including a plurality of emulated input screen formats and emulated output screen formats from the application system, each of said input formats and said output formats being individually callable into view on the display device by the user so that said processing system is operational even if said application system is inoperative, upon a keyboard entry by the user, displaying on the device a selected one of said emulated input screen formats, supplying input information to the device from the keyboard by the user in accordance with said displayed emulated input screen format, processing said input information with the processor to obtain processed input information, storing said processed input information in the storage medium, upon another keyboard entry by the user, displaying on the device one of said emulated output screen formats in correspondence to said selected one of said emulated input screen formats, supplying output information to the device from the keyboard by the user in accordance with said displayed emulated output screen format, processing said output information with the processor to obtain processed output information, and storing said processed output information in the storage medium, wherein the input-output transaction comprises a combination of said processed input information and said processed output information stored in the storage medium, determining from said transaction converted input data and converted output data, wherein said converted input data serves as input to and is compatible with the execution of the application system, and wherein said converted output data is representative of expected results from processing said converted input data by the application system, submitting said converted input data to the application system for execution to produce actual results, returning said actual results to the processing system, comparing said actual results to said expected results, and controlling the processing of the processing system in correspondence to said comparison.

* * * * *

UNITED STATES PATENT AND TRADEMARK OFFICE
CERTIFICATE OF CORRECTION

PATENT NO. : 5,045,994

DATED : September 3, 1991

INVENTOR(S) : Belfer-Lech-Perelmuter-Ward

It is certified that error appears in the above-identified patent and that said Letters Patent is hereby corrected as shown below:

Column 8, line 36, change "line of the display" to --line 24 of the display--.

Column 17, line 22, change "VDT 4000" to --VDT 400--;

Column 17, line 61, change ""addset" with" to --"addset" mode with--;

Column 17, line 67, change "alter" to --later--.

Column 18, line 29, "re"; should read -- are--.

Column 18, line 43, change "7320" to --720--.

Column 22, line 9, delete the number "10".

Column 27, line 67, change "e.g., t_c" to --e.g., t_cac--.

Signed and Sealed this

Fifteenth Day of June, 1993

Attest:

MICHAEL K. KIRK

Attesting Officer

Acting Commissioner of Patents and Trademarks